US010917753B2

(12) United States Patent
Chon et al.

(10) Patent No.: US 10,917,753 B2
(45) Date of Patent: Feb. 9, 2021

(54) ELECTRONIC DEVICE AND METHOD FOR PROVIDING INFORMATION BY ELECTRONIC DEVICE

(71) Applicant: Samsung Electronics Co., Ltd., Gyeonggi-do (KR)

(72) Inventors: Hongchun Chon, Gyeonggi-do (KR); Bumki Min, Gyeonggi-do (KR); Woongjo Woo, Gyeonggi-do (KR); Wonsuk Chung, Gyeonggi-do (KR); Hoon Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/802,046

(22) Filed: Feb. 26, 2020

(65) Prior Publication Data
US 2020/0280821 A1  Sep. 3, 2020

(30) Foreign Application Priority Data

Feb. 28, 2019  (KR) .......................... 10-2019-0024271

(51) Int. Cl.
*H04W 4/029*  (2018.01)
*H04W 4/38*   (2018.01)

(52) U.S. Cl.
CPC .............. *H04W 4/029* (2018.02); *H04W 4/38* (2018.02)

(58) Field of Classification Search
CPC ....... H04W 4/025; H04W 4/029; H04W 4/38; H04W 12/002; H04W 12/004
See application file for complete search history.

(56) References Cited

U.S. PATENT DOCUMENTS 10,664,842 B1 *  5/2020  Bermudez ........ G06Q 20/40145
2006/0224050 A1  10/2006  Lee et al.
(Continued)

FOREIGN PATENT DOCUMENTS

KR   1020060104355   10/2006
KR   1020160136657   11/2016

OTHER PUBLICATIONS

International Search Report dated Jun. 4, 2020 issued in counterpart application No. PCT/KR2020/002514, 3 pages.
(Continued)

*Primary Examiner* — Dinh Nguyen
(74) *Attorney, Agent, or Firm* — The Farrell Law Firm, P.C.

(57) ABSTRACT

An operation method of an electronic device is provided. The method includes receiving biometric information of a first user from a first external electronic device, receiving information sensed by a second external electronic device, which is located at a selected place associated with the first external electronic device, from the second external electronic device, generating user guide information at least partially based on the received biometric information of the first user and sensed information, receiving at least one of information indicating that the first external electronic device is located at the selected place and a user input for requesting of the user guide information via the second external electronic device, and in response to at least one of the received information and the user input, displaying the user guide information via a display device located at the selected place.

20 Claims, 14 Drawing Sheets

(56) References Cited

U.S. PATENT DOCUMENTS

| | | | |
|---|---|---|---|
| 2009/0322513 A1* | 12/2009 | Hwang | G06F 19/3418 |
| | | | 340/539.12 |
| 2011/0063105 A1* | 3/2011 | Bennett | H04W 76/50 |
| | | | 340/539.11 |
| 2011/0295102 A1* | 12/2011 | Lakkis | A61B 5/0002 |
| | | | 600/407 |
| 2013/0300578 A1* | 11/2013 | Uchida | G16H 40/67 |
| | | | 340/870.02 |
| 2015/0161871 A1 | 6/2015 | Kim et al. | |
| 2016/0162715 A1 | 6/2016 | Luk et al. | |
| 2016/0232625 A1 | 8/2016 | Akutagawa et al. | |
| 2016/0344569 A1 | 11/2016 | Chun et al. | |
| 2017/0020431 A1* | 1/2017 | Flitsch | A61B 7/003 |
| 2017/0030620 A1 | 2/2017 | Wu et al. | |
| 2017/0076740 A1* | 3/2017 | Feast | G06F 17/00 |
| 2017/0147064 A1* | 5/2017 | Yang | H04L 67/38 |
| 2018/0059881 A1 | 3/2018 | Agboatwalla et al. | |
| 2018/0139030 A1 | 5/2018 | Kim et al. | |

OTHER PUBLICATIONS

European Search Report dated Jul. 2, 2020 issued in counterpart application No. 20159047.8-1222, 8 pages.

* cited by examiner

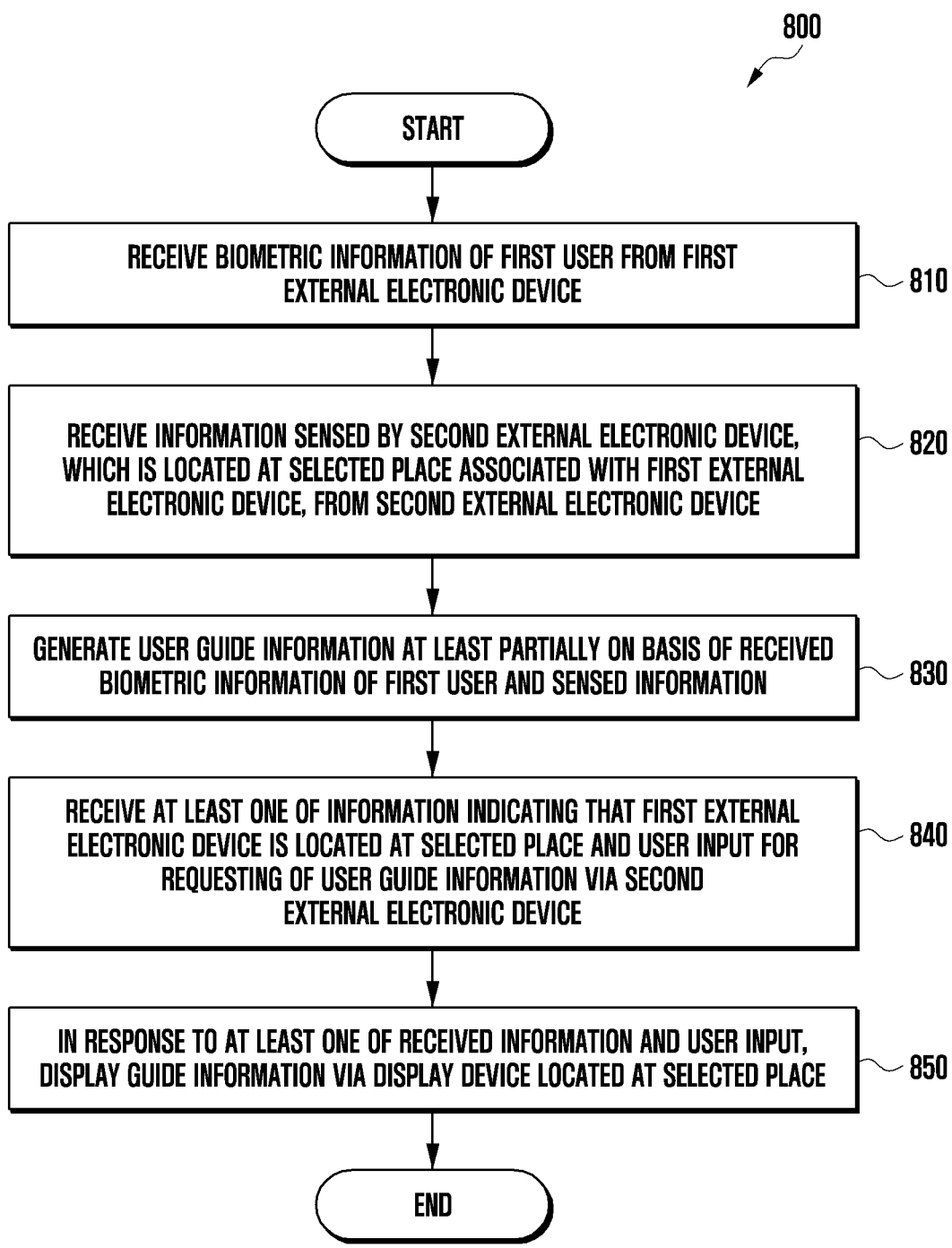

FIG. 10B
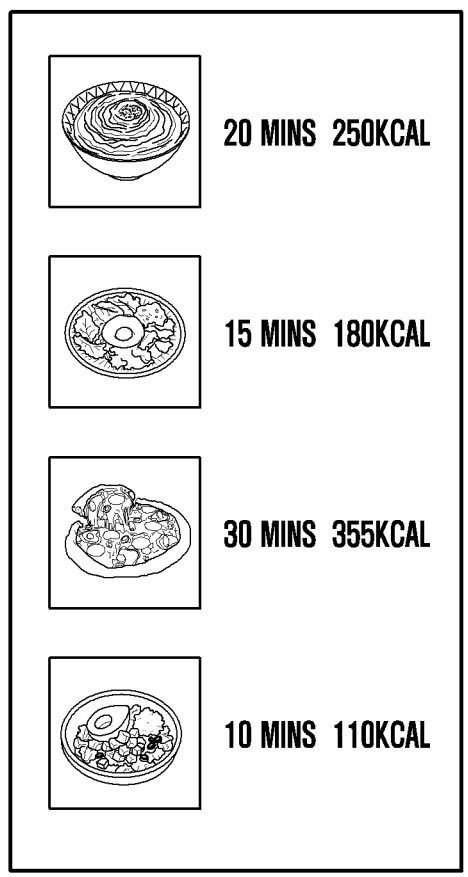
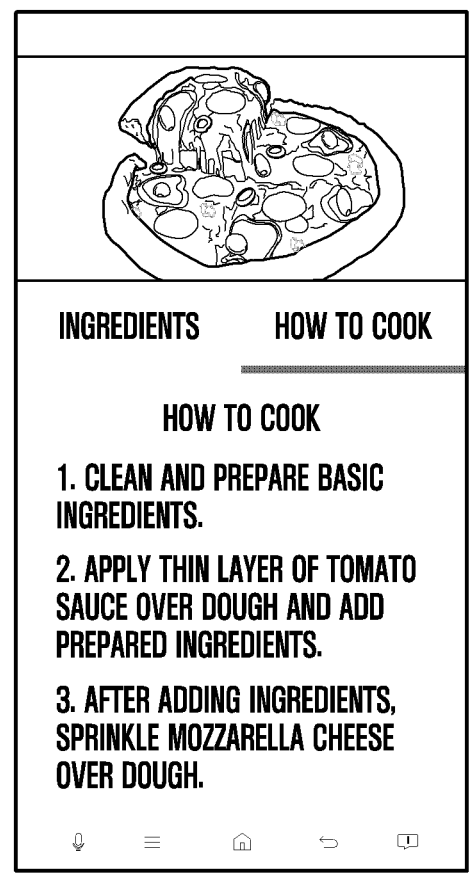
<1060>  <1070>

ELECTRONIC DEVICE AND METHOD FOR PROVIDING INFORMATION BY ELECTRONIC DEVICE

CROSS-REFERENCE TO RELATED APPLICATION(S)

This application is based on and claims priority under 35 U.S.C. 119 to Korean Patent Application Serial No. 10-2019-0024271, filed on Feb. 28, 2019, in the Korean Intellectual Property Office, the entire disclosure of which is incorporated herein by reference.

BACKGROUND

1. Field

The disclosure relates generally to a device and method for providing user guide information suitable for a user based on at least a part of information received from a plurality of external electronic devices by an electronic device.

2. Description of Related Art

Recently, various electronic devices have been used in daily life. For example, many users use portable terminals (e.g., mobile phones or tablets) and wearable devices (e.g., smart watches and smart bands), and use various home appliances (e.g. refrigerators, air conditioner, microwave, and TV) at home. Via these various electronic devices, research into a technology for providing an optimized function to a user in addition to original functions continues. For example, technical research for selecting and providing, via electronic devices, information suitable for a user from generally known information continues.

SUMMARY

The disclosure has been made to address at least the disadvantages described above and to provide at least the advantages described below.

In accordance with an aspect of the present disclosure, an electronic device is provided. The electronic device includes a communication interface configured to communicate with at least one external electronic device, at least one processor operatively connected to the communication interface, and at least one memory operatively connected to the processor, wherein the memory stores instructions that, when executed, cause the processor to receive information of a first user from a first external electronic device by the communication interface, receive information of a second user from a second external electronic device by the communication interface, receive information sensed by a third external electronic device, which is located at a selected place associated with at least one of the first external electronic device or the second external electronic device, from the third external electronic device by the communication interface, generate user guide information at least partially based on the received information of the first user, information of the second user, and sensed information, receive, by the communication interface, at least one of information indicating that the first or second external electronic device is located at the selected place, and a user input for requesting of the user guide information via the third external electronic device, and in response to at least one of the received information or the user input, display the user guide information via a display device located at the selected place.

In accordance with an aspect of the present disclosure, an electronic device is provided. The electronic device includes a communication interface configured to communicate with at least one external electronic device, at least one processor operatively connected to the communication interface, and at least one memory operatively connected to the processor, wherein the memory stores instructions that, when executed, cause the processor to receive biometric information of the first user from a first external electronic device by the communication interface, receive information sensed by a second external electronic device, which is located at a selected place associated with the first external electronic device, from the second external electronic device by the communication interface, generate user guide information at least partially based on the received biometric information of the first user and sensed information, receive, by the communication interface, at least one of information indicating that the first external electronic device is located at the selected place and a user input for requesting of the user guide information via the second external electronic device, and in response to at least one of the received information or the user input, display the user guide information via a display device located at the selected place.

In accordance with an aspect of the present disclosure, an operation method of an electronic device is provided. The method includes receiving information of a first user from a first external electronic device, receiving information of a second user from a second external electronic device, receiving information sensed by a third external electronic device, which is located at a selected place associated with at least one of the first external electronic device or the second external electronic device, from the third external electronic device, generating user guide information at least partially based on the received information of the first user, information of the second user, and sensed information, receiving at least one of information indicating that the first or second external electronic device is located at the selected place, and a user input for requesting of the user guide information via the third external electronic device, and in response to at least one of the received information or the user input, displaying the user guide information via a display device located at the selected place.

In accordance with an aspect of the present disclosure, an operation method of an electronic device is provided. The method includes receiving biometric information of a first user from a first external electronic device, receiving information sensed by a second external electronic device, which is located at a selected place associated with the first external electronic device, from the second external electronic device, generating user guide information at least partially based on the received biometric information of the first user and sensed information, receiving at least one of information indicating that the first external electronic device is located at the selected place and a user input for requesting of the user guide information via the second external electronic device, and in response to at least one of the received information or the user input, displaying the user guide information via a display device located at the selected place.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 8 is a flowchart illustrating a method for providing information by an electronic device, according to an embodiment;

FIG. 10B is a diagram illustrating an operation of another electronic device, according to an embodiment.

DETAILED DESCRIPTION

Figure 1:
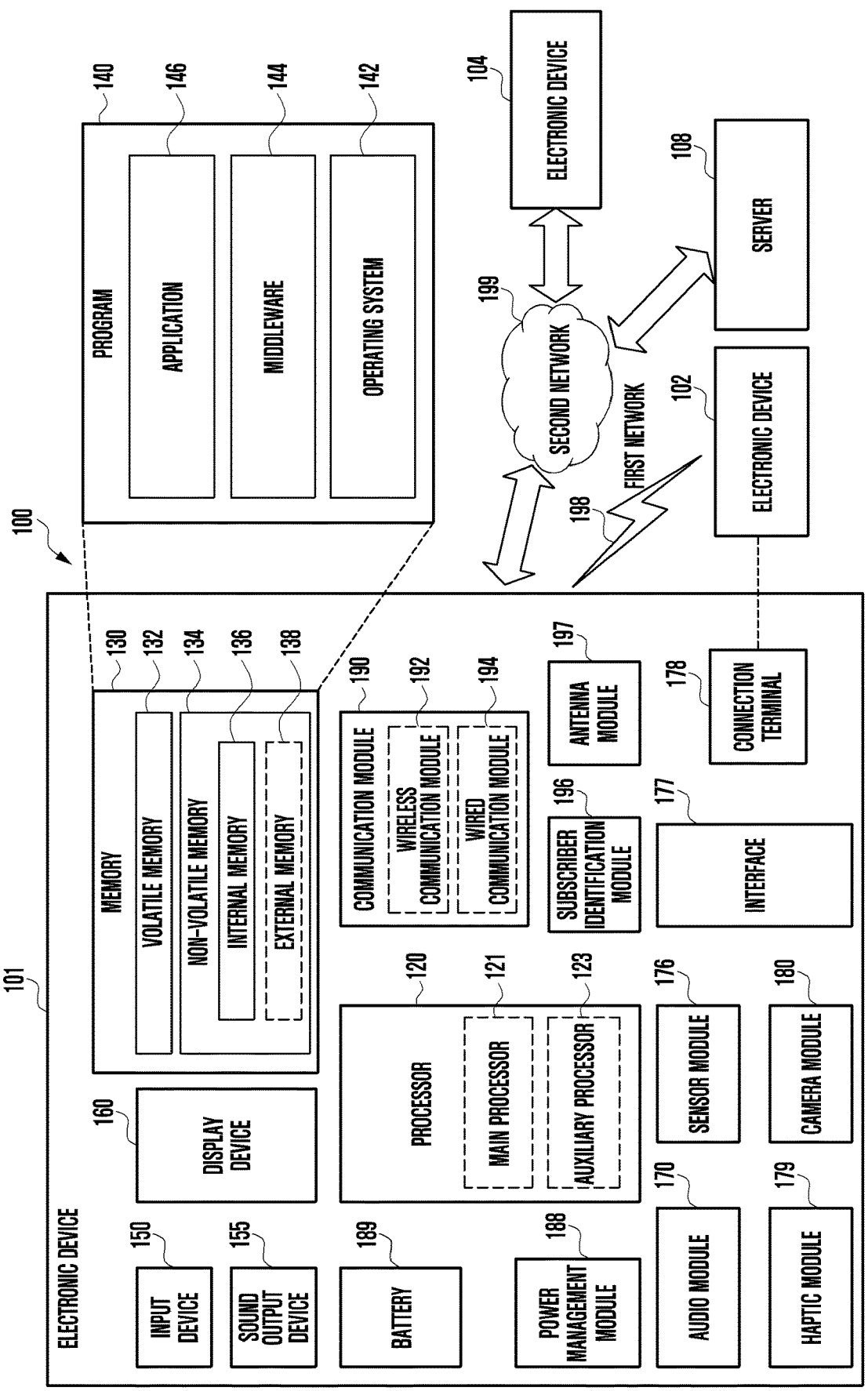
FIG. 1 is a diagram of an electronic device within a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one antenna including a radiator made of a conductor or a conductive pattern formed on a substrate (e.g., a printed circuit board (PCB)). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna. In some embodiments, a part of the antenna module 197 may be formed of other components (e.g., RFIC) than the radiator.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
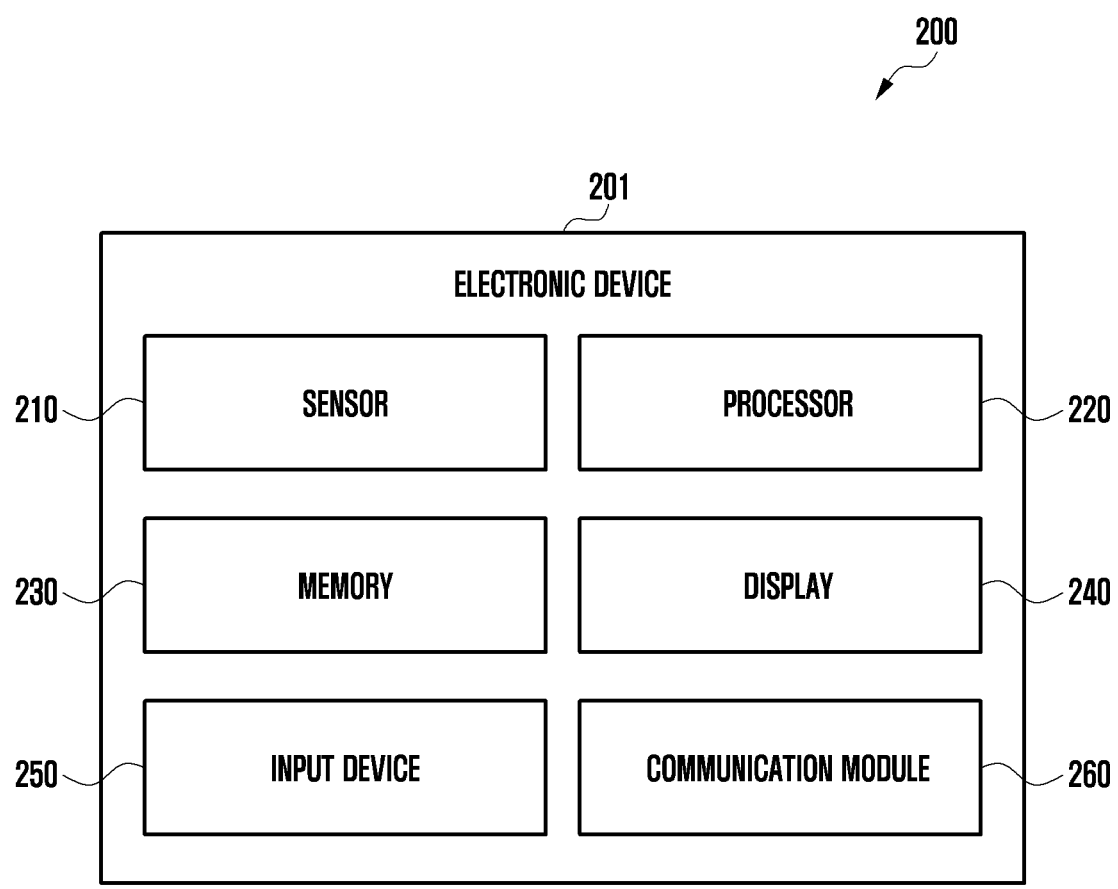
FIG. 2 is a diagram of an electronic device, according to an embodiment.

FIG. 2 is a diagram 200 of an electronic device, according to an embodiment.

An electronic device 201 may include a sensor 210, a processor (e.g., including processing circuitry) 220, a memory 230, a display 240, an input device 250, and a communication module (e.g., including communication circuitry) 260. The electronic device 201 may include at least a part of elements of the electronic device 100 illustrated in FIG. 1. The electronic device 201 may include a portable device (e.g., a cellular phone and a tablet) or a wearable device (e.g., a smart watch).

The electronic device 201 may include at least one sensor 210. The sensor 210 may include the sensor module 176 illustrated in FIG. 1. The sensor 210 may measure information of a user. The sensor 210 may measure biometric information of a user or information of the electronic device 201 in real time. The sensor 210 may include at least one of a gyro sensor, an acceleration sensor, a heart rate sensor (e.g., a heart rate monitoring (HRM) sensor), or a photoplethysmograph (PPG) sensor, but is not limited thereto and may include various sensors. The sensor 210 may measure at least one of a posture, a direction, a position, or a movement of the electronic device 201. The sensor 210 may measure at least one of the number of steps of a user, whether or not the user moves, a moving speed, or a moving direction, via pedestrian dead reckoning (PDR). The sensor 210 may recognize activity information of a user based on measured information. The sensor 210 may recognize at least one of a state, a movement, or a gesture of a user.

The sensor 210 may measure biometric information of a user. For example, the biometric information of the user may include at least one of the user's heart rate, electrocardiogram, blood sugar, blood pressure, stress, calorie intake, calorie consumption, or health condition. The PPG sensor may emit light to the user's body via an emitter (e.g., a light emitting diode (LED)), and may receive light reflected from the user's body via a receiver. The PPG sensor may measure at least one of a heart rate, stress, or various biometric information of the user by analyzing the amount, intensity, or pattern of received reflected light.

The sensor 210 may include an image sensor (e.g., a camera). A camera may generate an image by photographing a user or external subjects of the electronic device 201. According to an embodiment, the sensor 210 (e.g., a global positioning system (GPS)) may sense a location of the electronic device 201.

The processor 220 may include the processor 120 illustrated in FIG. 1.

The processor 220 may receive information sensed by at least one sensor 210, at once or multiple times according to time. The processor 220 may read and analyze information of a user, which is stored in the memory 230 (e.g., a database). The information of the user, which is stored in the memory 230, may include at least one of life style information of the user, health condition information of the user (e.g., a disease state of the user), food information, activity information, biometric information, schedule information, or preference information of the user. The processor 220 may receive, from an external server (e.g., the server 106 of FIG. 1) or an external electronic device (e.g., the electronic device 102 or 104 of FIG. 1), information of a user of the external electronic device or information of another user of the external electronic device via the communication module 260. The processor 220 may transmit information of a user, which is stored in the memory 230, or information received from the sensor 210 via the communication module 260 to an external server or an external electronic device.

The processor 220 may determine a movement, a state, or an activity of a user by analyzing information input by a user via the input device 250 or information received from the sensor 210. The processor 220 may recognize at least one of a movement, a state, or a shape of the user by analyzing an image captured by the camera. The processor 220 may recognize at least one of the user's health condition, calorie intake, calorie consumption, an exercise amount of the user, or a type of activity performed by the user (e.g., resting (sedentary), walking, running, cycling, or moving in vehicle)), by analyzing information received from the sensor 210. The processor 220 may recognize a change in a health condition of the user (e.g., heart rate, electrocardiogram, and stress) by analyzing biometric information received from the sensor 210.

The processor 220 may generate user guide information suitable for the user based on sensor data input from the sensor 210 or information received from the user via the input device 250. The processor 220 may generate the guide information based on the user's meal plan (e.g., diet and cooking information selected by the user) or the biometric information of the user, which is sensed via the sensor 210. The processor 220 may generate a meal recipe suitable for the user based on at least one of the user's blood sugar, heart rate, electrocardiogram, stress, calorie intake, calorie consumption, an activity state of the user, physical information of the user (e.g., height, weight), or a health condition of the user (e.g., the presence/absence and type of disease of the user). The meal recipe may include at least one of a cooking method or a type (menu) and amount of a dish suitable for the user.

The processor 220 may request a service provided by an external electronic device, an external server, or an external system via the communication module 260. The processor 220 may request a service provided by an external electronic device, an external server, or an external system at least partially based on the generated user guide information. The processor 220 may provide a purchase service or a delivery service of an item (e.g., ingredients) required by the user, based on the user guide information (e.g., a meal recipe).

The display 240 may include the display device 160 illustrated in FIG. 1. The display 240 may display information. The display 240 may display information of a user, which is measured by the sensor 210, information analyzed by the processor 220, or information received from an external server or an external electronic device. The display 240 may display user guide information suitable for a user.

The input device 250 may include the input device 150 illustrated in FIG. 1. The input device 250 may include at least one of a physical key, a button, or a touch panel. The electronic device 201 may include a touch screen in which the display 240 and the input device 250 are integrally included.

The input device 250 may receive information from the user. The input device 250 may receive, from the user, at least one of schedule information of the user (e.g., a meal plan, a schedule, an event, or an anniversary, etc.), activity information (e.g., the number of steps, calories consumption, food intake information, or exercise information of the user), or condition information of the user (e.g., health condition information of the user (e.g., the presence/absence and type of disease)).

The memory 230 may include the memory 130 illustrated in FIG. 1. The memory 230 may store at least one among data input by a user via the input device 250, information of the user, which is measured using the sensor 210, data or information received via the communication module 260, and data or information processed by the processor 220.

The communication module 260 may include the communication module 190 illustrated in FIG. 1. The communication module 260 may transmit data or information of the electronic device 201 to an external electronic device or may receive data or information from the external electronic device, via wired communication or various wireless networks, such as a cellular network (e.g., $3^{rd}$ generation (3G), long term evolution (LTE), $5^{th}$ generation (5G) network, etc.), Wi-Fi, Bluetooth™ (BLE), and ANT+.

Under the control of the processor 220, the communication module 260 may transmit, to an external electronic device or an external driver, at least a part of information measured by the sensor 210, information input by a user via the input device 250, and information analyzed by the processor 220. Under the control of the processor 220, the communication module 260 may transmit, to an external electronic device or an external server, information indicating that the electronic device 201 is located at a selected place. Under the control of the processor 220, the communication module 260 may receive, from an external electronic device or an external server, user guide information corresponding to transmitted user information. The communication module 260 may receive, from an external electronic device or an external server, user guide information (e.g., a meal recipe) optimized to the user.

Figure 3:
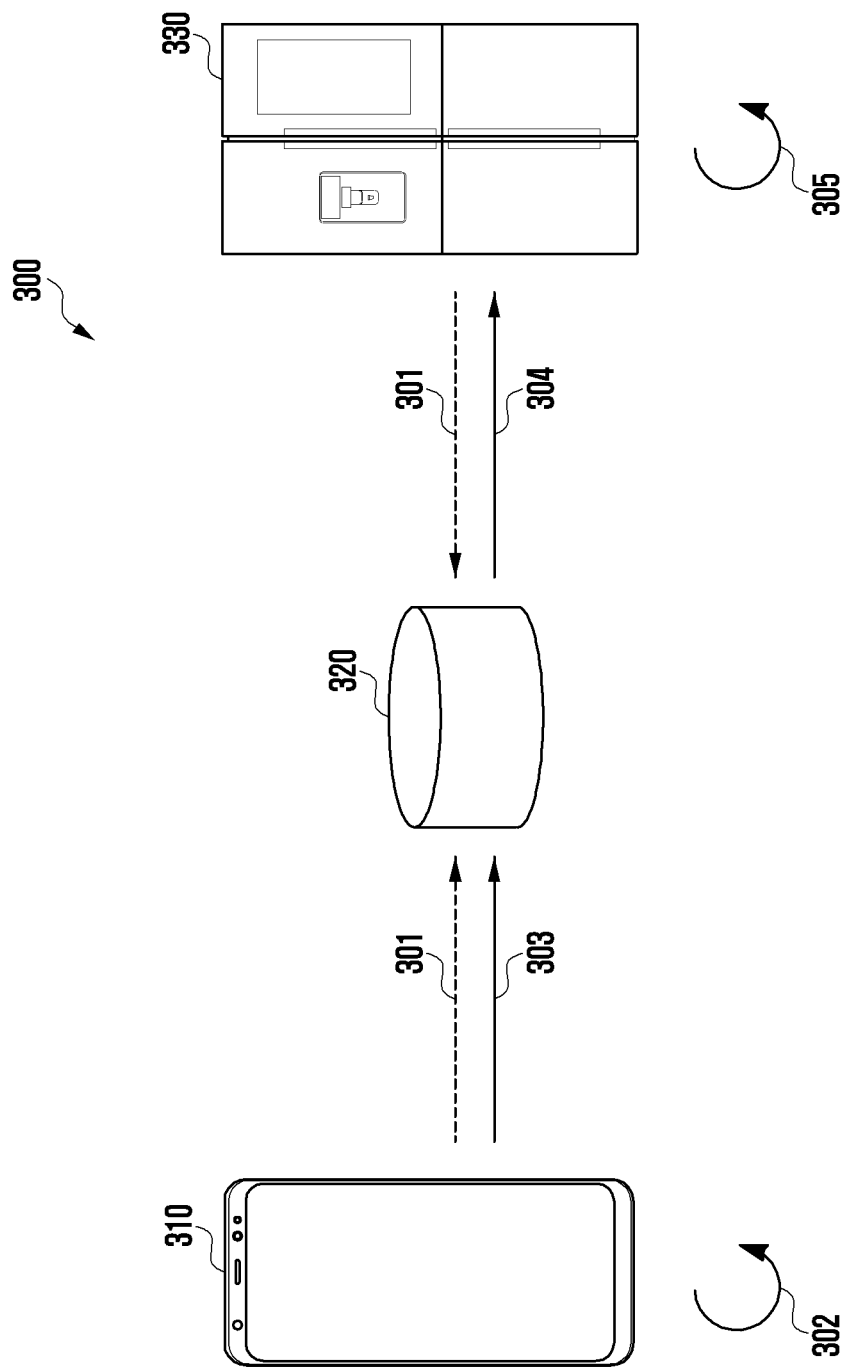
FIG. 3 is a diagram illustrating a method for providing information by an electronic device, according to an embodiment.

FIG. 3 is a diagram illustrating a method for providing information by an electronic device, according to an embodiment. A system 300 which provides guide information to a user may include an electronic device 320, a first external electronic device 310, and a second external electronic device 330. At least one of the electronic device 320, the first external electronic device 310, or the second external electronic device 330 may include at least a part of elements of the electronic device 101 illustrated in FIG. 1 or the electronic device 201 illustrated in FIG. 2. The electronic device 320 may include a server, a cloud, or a service platform. The first external electronic device 310 may include a portable electronic device (e.g., a cellular phone, a tablet, etc.) or a wearable device (e.g., a smart band or a smart watch). The second external electronic device 330 may include a home appliance (e.g., a smart refrigerator).

The electronic device 320 may include account information. In operation 301, the first external electronic device 310 and the second external electronic device 330 may register device information in the account information of the electronic device 320. The account information of the electronic device 320 may include information relating to a device (e.g., information of the first external electronic device 310) associated with each user included in a specific group, and a shared device (e.g., information of a second external electronic device 330). The second external electronic device 330 may include group account information. The group account information may include account information of the first electronic device 310 and/or account information of another external electronic device. The second external electronic device 330 may be used as a shared device of a configured group (e.g., family), and the second external electronic device 330 may include group account information including account information of an external electronic device (e.g., the first external electronic device 310) used by each member of the configured group. The second external electronic device 330 may be connected to a device (e.g., the first external electronic device 310) of at least one belonging to the group at least partially based on the group account information.

In operation 302, the first external electronic device 310 may receive schedule information from a user. The schedule information may include a meal plan of the user. The meal plan may include at least one type of food desired by the user, a meal time, or a type of meal (e.g., breakfast, lunch, dinner, or snack). The first external electronic device 310 may receive user information from the user. The first external electronic device 310 may receive, from the user, at least one piece of information of a health condition of the user (e.g., the presence or absence of disease, the presence or absence of allergies, or medication information), an activity performed by the user, food intake-related information, whether the user is on a diet, or a user profile (e.g., age, height, weight, nationality, religion, preference information).

In operation 303, the first external electronic device 310 may transmit information (e.g., schedule information) received from the user to the electronic device 320.

In operation 304, the electronic device 320 may generate user guide information based on information received from the external electronic device 310, and may transmit the user guide information to the second external electronic device 330. The user guide information may include a meal recipe suitable for the user. The meal recipe may include at least one of a name, calories, or a cooking method of food. The electronic device 320 may search for or generate a meal recipe suitable for the user based on at least one of the user's height, weight, blood sugar, calorie intake, or calorie consumption. The electronic device 320 may search for or generate a meal recipe in consideration of a disease history or the presence or absence of allergies of the user. The electronic device 320 may search for or generate a meal recipe based on at least one of the user's country, culture, religion, climate, or weather. The electronic device 320 may search for or generate a meal recipe based on whether the user (the first external electronic device 310) is present at a selected place (e.g., the user's home) or whether the user is in weight management). The electronic device 320 may search for or generate a meal recipe based on schedule information (e.g., an anniversary, an event, and a schedule) of the user.

The user guide information may include advertisement information. The electronic device 320 may generate, as the user guide information, an advertisement suitable for the user based on the user information. The electronic device 320 may generate, as the user guide information, an advertisement associated with a meal menu suitable for biometric information of the user based on the schedule information and the biometric information of the user. The electronic device 320 may generate, as the user guide information, an advertisement related to an item or a service necessary for the user (e.g., a medical service (e.g., medical guides, hospitals, or pharmacies), ordering and delivering of food or ingredients, drugs or nutritional supplements necessary for the user, and public service/health advertisements), based on the biometric information of the user.

In operation 305, the second external electronic device 330 may monitor inside of the second external electronic device 330 by a sensor module. The second external electronic device 330 may monitor ingredients or foods which are stored within the second external electronic device 330. The second external electronic device 330 may compare monitored information with received user guide information (e.g., a meal recipe). The second external electronic device 330 may display the user guide information when the monitored information is suitable for the user guide information. If the stored ingredients are suitable for a received meal recipe, the second external electronic device 330 may provide the user with a corresponding meal recipe on a display. If the monitored information is not suitable for the received user guide information, the second external electronic device 330 may provide different user guide information or may request an external service. If the stored ingredients are not suitable for the received meal recipe (e.g., if at least a part of the stored ingredients is insufficient), the second external electronic device 330 may search for a recipe for another dish, which is similar to the received meal recipe, wherein the another dish can be made from the stored ingredients. The second external electronic device 330 may request a recipe of another similar dish from the electronic device 320, or may select and display a recipe of another similar dish from among recipes stored therein. If the stored ingredients are not suitable for the received meal recipe (e.g., if at least a part of the stored ingredients is insufficient), the second external electronic device 330 may request a purchase service or a delivery service for insufficient ingredients from the electronic device 320 or an external service.

The second external electronic device 330 may transmit sensing information obtained by monitoring inside thereof to the electronic device 320. The electronic device 320 may generate user guide information based on user information received from the first external electronic device 310 and the sensing information received from the second external electronic device 330. The electronic device 320 may generate user guide information (e.g., a meal recipe) suitable for the user at least partially based on the user's biometric information, schedule information (e.g., a meal plan), or sensing information (e.g., information of ingredients stored in the second external electronic device 330). The electronic device 320 may allow the second external electronic device 330 to display the generated user guide information. The electronic device 320 may allow the second external electronic device 330 to display the user guide information at a configured time based on the schedule information of the user, may allow the second external electronic device 330 to display the user guide information at the configured time in response to information indicating that the first external electronic device 310 is located at a selected place (e.g., the user's house), or may allow the second external electronic device 330 to display the user guide information in response to reception of a user input for requesting of the user guide information via the second external electronic device 330.

Figure 4:
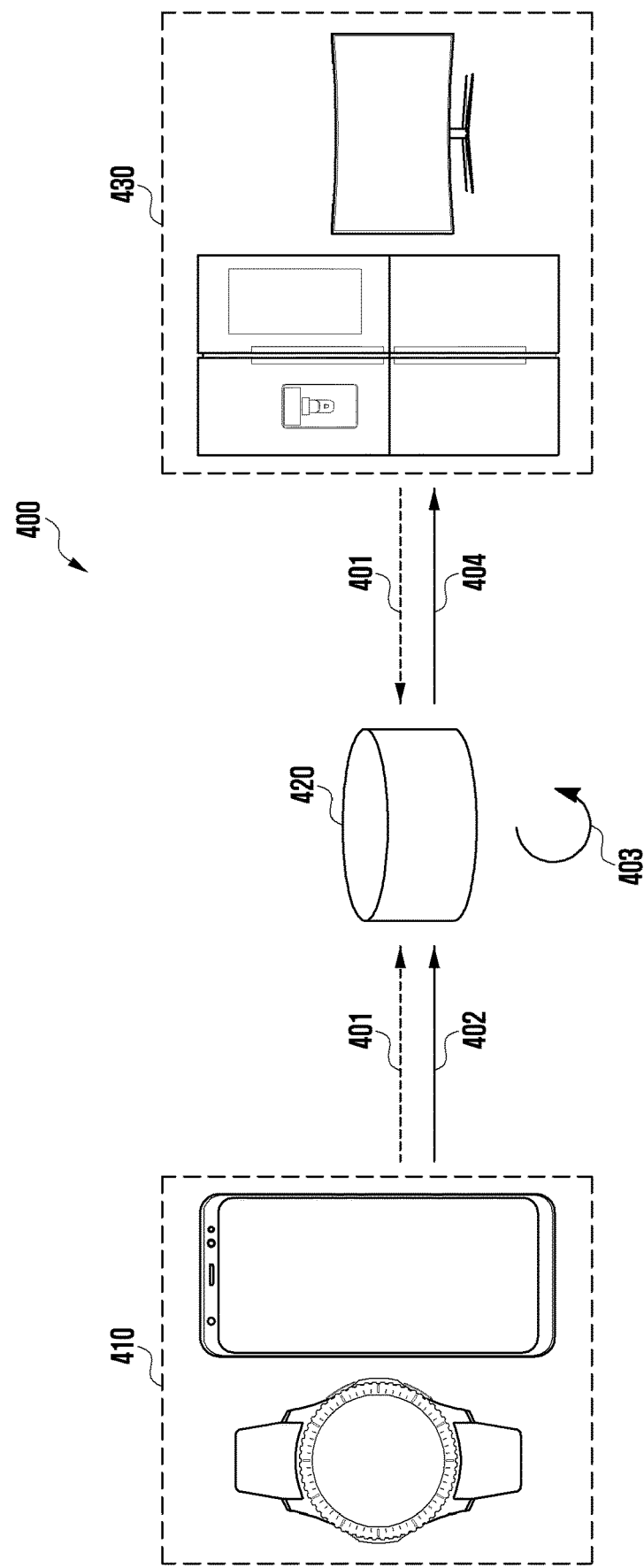
FIG. 4 is a diagram illustrating a method for providing information by an electronic device, according to an embodiment.

FIG. 4 is a diagram illustrating a method for providing information by an electronic device, according to an embodiment.

A system 400 which provides guide information to a user may include an electronic device 420, a first external electronic device 410, and a second external electronic device 430. At least one of the electronic device 420, the first external electronic device 410, or the second external electronic device 430 may include at least a part of elements of the electronic device 101 illustrated in FIG. 1 or the electronic device 201 illustrated in FIG. 2. The electronic device 420 may include a server, a cloud, or a service platform. The first external electronic device 410 may include a portable electronic device (e.g., a cellular phone, a tablet, etc.) or a wearable device (e.g., a smart band or a smart watch). The second external electronic device 430 may include a home appliance (e.g., a smart refrigerator).

The electronic device 420 may include account information. In operation 401, the first external electronic device 410 and the second external electronic device 430 may register device information in the account information of the electronic device 420. The account information of the electronic device 420 may include information relating to a device (e.g., information of the first external electronic device 410) associated with each user included in a specific group, and a shared device (e.g., information of a second external electronic device 430).

In operation 402, the first external electronic device 410 may transmit biometric information of a user to the electronic device 420. The first external electronic device 410 may acquire the biometric information of the user by at least one sensor. The biometric information of the user may include at least one of the user's heart rate, electrocardiogram, blood sugar, blood pressure, stress, calorie intake, calorie consumption, exercise amount, or health condition. The electronic device 420 may repeatedly receive the biometric information of the user from the first external electronic device 410 to update the biometric information of the user.

In operation 403, the electronic device 420 may generate user guide information based on information (e.g., the biometric information of the user) received from the first external electronic device 410. The user guide information may include a meal recipe suitable for the user. The meal recipe may include at least one of a name, calories, or a cooking method of food. The electronic device 420 may search for or generate a meal recipe suitable for the user based on the biometric information (e.g., a blood pressure or blood sugar) of the user. The electronic device 420 may generate a meal recipe based on at least one of the user's calorie consumption, calorie intake, exercise amount, or blood sugar, and may provide the user with a meal notification at a suitable time. The electronic device 420 may search for or generate a meal recipe suitable for the user based on physical information including the user's height and weight. The electronic device 420 may search for or generate a meal recipe by considering the user's disease history or the presence/absence of an allergy, and may search for and generate a meal recipe based on at least one of the user's country, culture, religion, climate, or weather. The electronic device 420 may search for or generate a meal recipe based on whether the user (the first external electronic device 410) is present at a selected place (e.g., the user's home) or whether the user is in weight management. If the user is on a diet, the electronic device 420 may select a low-calorie meal menu and may search for or generate a meal recipe therefor.

In operation 404, the electronic device 420 may allow the second external electronic device 430 to display the user guide information. The electronic device 420 may allow the second external electronic device 430 to display the user guide information at a suitable time (or a configured time) based on user information (e.g., the user's biometric information or schedule information). The electronic device 420 may determine a suitable eating time of the user (e.g., when the user has an empty stomach or a time at which the user needs to eat food) based on calorie consumption or exercise amount of the user, and may allow the user guide information to be displayed via the second external electronic device 430 at the determined time. The electronic device 420 may determine a suitable eating time of the user (e.g., when the user has an empty stomach or a time at which the user needs to eat food) based on at least one of calorie consumption or exercise amount of the user, and may allow, at a determined time, the first external electronic device 410 to display the user guide information or provide a notification. The electronic device 420 may allow the second external electronic device 430 to display the user guide information at the configured time in response to information indicating that the first external electronic device 410 is located at a selected place (e.g., the user's house), or may allow the second external electronic device 430 to display the user guide information in response to reception of a user input for requesting of the user guide information via the second external electronic device 430.

Figure 5:
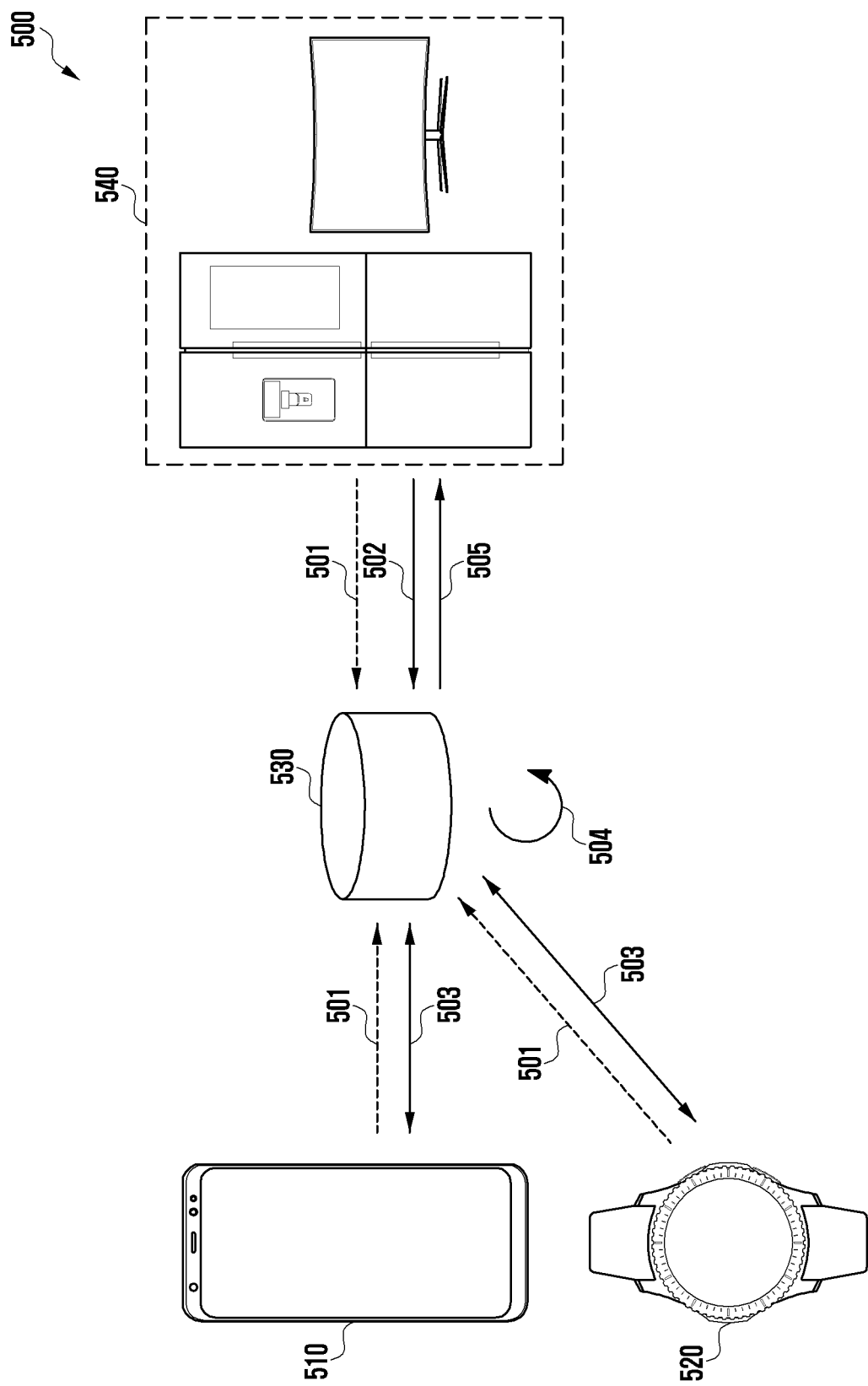
FIG. 5 is a diagram illustrating a method for providing information by an electronic device according to an embodiment.

FIG. 5 is a diagram illustrating a method for providing information by an electronic device, according to an embodiment.

A system 500 providing guide information to a user may include an electronic device 530, a first external electronic device 510 of a first user, a second external electronic device 520 of a second user, and a third external electronic device 540. The system 500 may further include a plurality of external electronic devices 530 for a plurality of users. However, hereinafter, it will be assumed that the first external electronic device 510 of the first user and the second external electronic device 520 of the second user are included. At least one of the electronic device 530, the first external electronic device 510, the second external electronic device 520, or the third external electronic device 540 may include at least a part of elements of the electronic device illustrated in FIG. 1 or in FIG. 2. The electronic device 530 may include a server, a cloud, or a service platform. The first external electronic device 510 and the second external electronic device 520 may include a portable electronic device 530 (e.g., a cellular phone or a tablet) or a wearable device (e.g., a smart watch or smart band). The third external electronic device 540 may include a home appliance (e.g., a smart refrigerator).

In operation 501, the first external electronic device 510 and the second external electronic device 520 may register account information of the first user and the second user in group account information of the electronic device 530, respectively. The group account information may include first user account information and second user account information. The third external electronic device 540 may include the group account information.

In operation 501, the first external electronic device 510 may transmit information (e.g., the first user's biometric information, schedule information, or other information associated with the first user) of the first user to the electronic device 530. The second external electronic device 520 may transmit information (e.g., the second user's biometric information, schedule information, or other information associated with the second user) of the second user to the electronic device 530.

In operation 501, the third external electronic device 540 may transmit, to the electronic device 530, sensing information obtained by monitoring inside of the third external electronic device 540 by a sensor module. If the third external electronic device 540 is a refrigerator, the third external electronic device 540 may monitor ingredients stored therein by the sensor module, and may provide sensing information therefor to the electronic device 530.

In operation 502, the third external electronic device 540 may provide the electronic device 530 with a meal plan for a group including the first user and the second user. The third external electronic device 540 may receive the meal plan for the group, which is input by the user (e.g., the first user or the second user) included in the group. The third external electronic device 540 may generate a meal plan for the group based on the schedule information of the first user and the schedule information of the second user, which have been received from the first external electronic device 510 and the second external electronic device 520, and may provide the generated meal plan to the electronic device 530. The electronic device 530 may not receive the meal plan for the group from the third external electronic device 540, and may generate the meal plan for the group based on the schedule information of the first user or the schedule information of the second user, which have been received from the first external electronic device 510 and the second external electronic device 520.

In operation 503, the electronic device 530 may request the first external electronic device 510 or the second external electronic device 520 to confirm whether to be present at a selected place associated with the first external electronic device 510 or the second external electronic device 520 at a configured time. The configured time may include a time configured by the first user via the first external electronic device 510, a time configured by the second user via the second external electronic device 520, and a time configured based on information (e.g., schedule information (e.g., a meal plan) of the first or second user) of the first or second user. The first external electronic device 510 or the second external electronic device 520 may transmit, to the electronic device 530, a response to whether to be present at the selected place at the configured time, in response to the request of the electronic device 530.

In operation 504, the electronic device 530 may generate user guide information based on at least a part of the received first user's information and second user's information, and the response to whether to be present at the selected place, which is received from the first external electronic device 510 and the second external electronic device 520. The electronic device 530 may generate the user guide information according to whether users belonging to the group account are present. When the first external electronic device 510 of the first user, the second external electronic device 520 of the second user, a fourth external electronic device of a third user, and a fifth external electronic device of a fourth user are registered in the group account, guide information may be generated according to whether the first to fourth users are present. If all of the first to fourth users are present, the electronic device 530 may generate, as the user guide information, a meal recipe suitable for all of the first to fourth users. The meal recipe may include information on at least one of a meal menu, a quantity, a cooking method, a cooking time, calories, or nutrients. If only the first user and the second user are present among the first to fourth users, the electronic device 530 may generate, as the user guide information, a meal recipe suitable for the first user and the second user. The electronic device 530 may generate the user guide information based on the sensing information received from the third external electronic device 540. The electronic device 530 may generate the user guide information based on the number of users present at the selected place and the sensing information (e.g., information of ingredients stored in the third external electronic device 540) received from the third external electronic device 540. When the sensing information of the ingredients stored in the third external electronic device 540 is received, the electronic device 530 may select a food that can be made using the stored ingredients, and may generate a recipe therefor as the user guide information. The electronic device 530 may request an external service based on the received sensing information. If there are less ingredients than ingredients for a recipe of a meal menu suitable for users who will be present at the selected place, based on the ingredient information received from the third external electronic device 540, the electronic device 530 may request an external item purchase service or delivery service so as to request a purchase or delivery of items (e.g., insufficient ingredients).

In operation 505, the electronic device 530 may allow the third external electronic device 540 to display the generated user guide information. The electronic device 530 may allow the third external electronic device 540 to display the user guide information at the configure time based on the schedule information of the first user and the schedule information of the second user. The electronic device 530 may allow the third external electronic device 540 to display the user guide information based on schedule information of a user who is present or will be present at the selected place, from among user accounts included in the group account. The electronic device 530 may allow the third external electronic device 540 to display the user guide information in response to information indicating that the first external electronic device 510 or the second external electronic device 520 is located at the selected place (e.g., the user's house). The electronic device 530 may allow the third external electronic device 540 to display the user guide information in response to reception of a user input for requesting of the user guide information via the third external electronic device 540. The electronic device 530 may allow a display device (e.g., a display of the first external electronic device 510 or second external electronic device 520, or another home appliance, Internet of things (IoT) device, or nearble device located at the selected place) other than the third external electronic device 540 to display the user guide information.

Figure 6A:
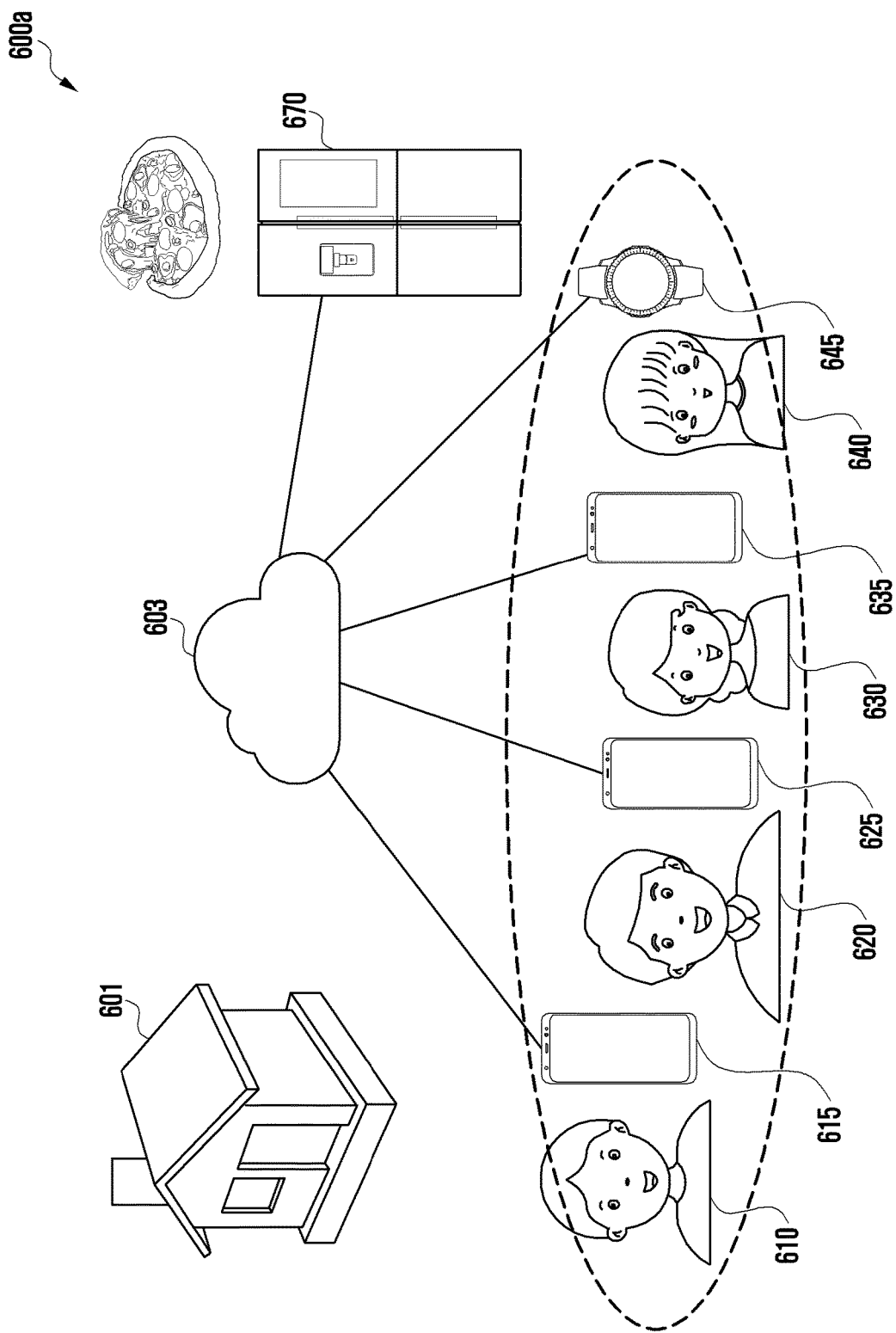
FIG. 6A is a diagram illustrating examples of operations of providing information by an electronic device, according to an embodiment.
Figure 6B:
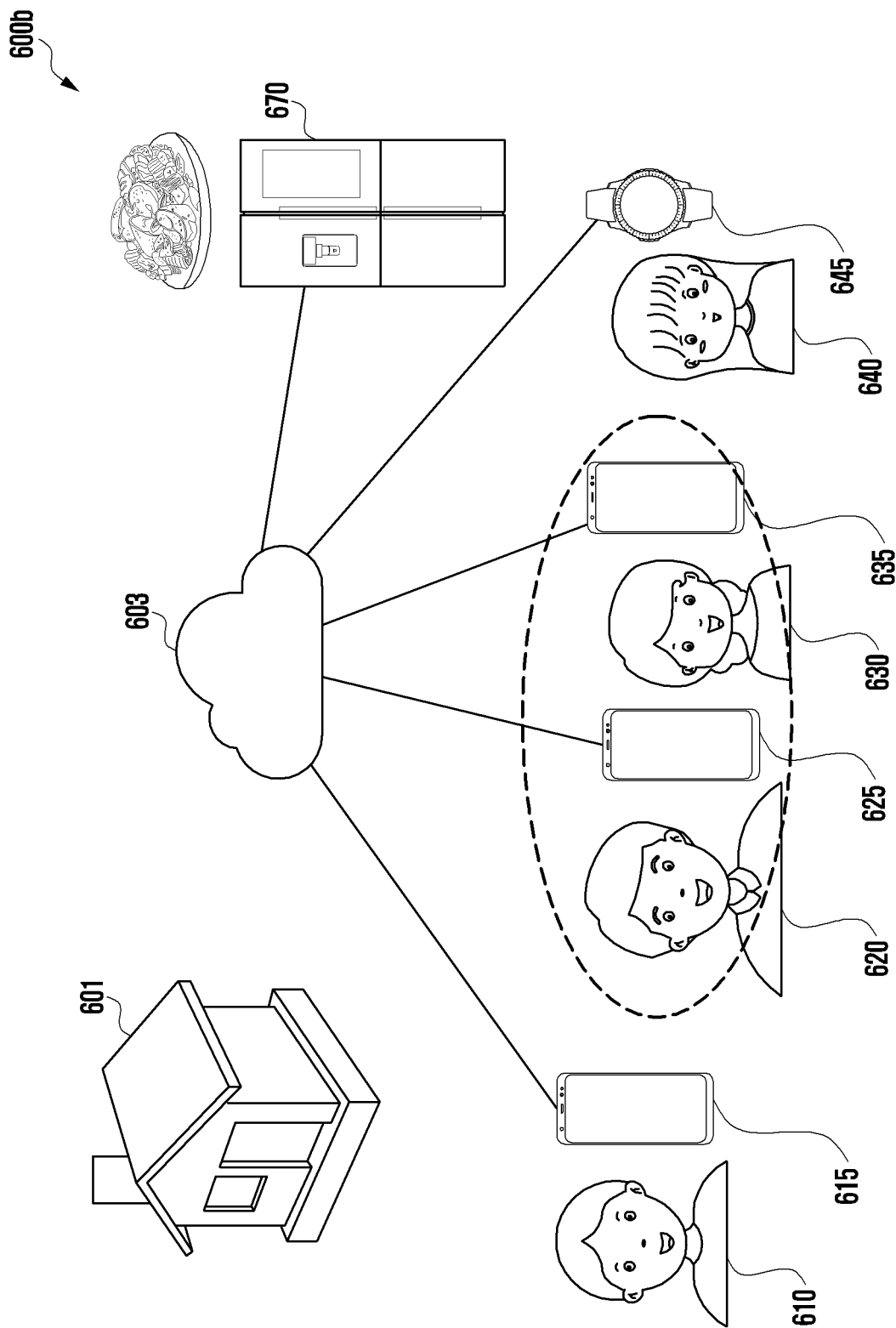
FIG. 6B is a diagram illustrating examples of operations of providing information by an electronic device, according to an embodiment.
Figure 6C:
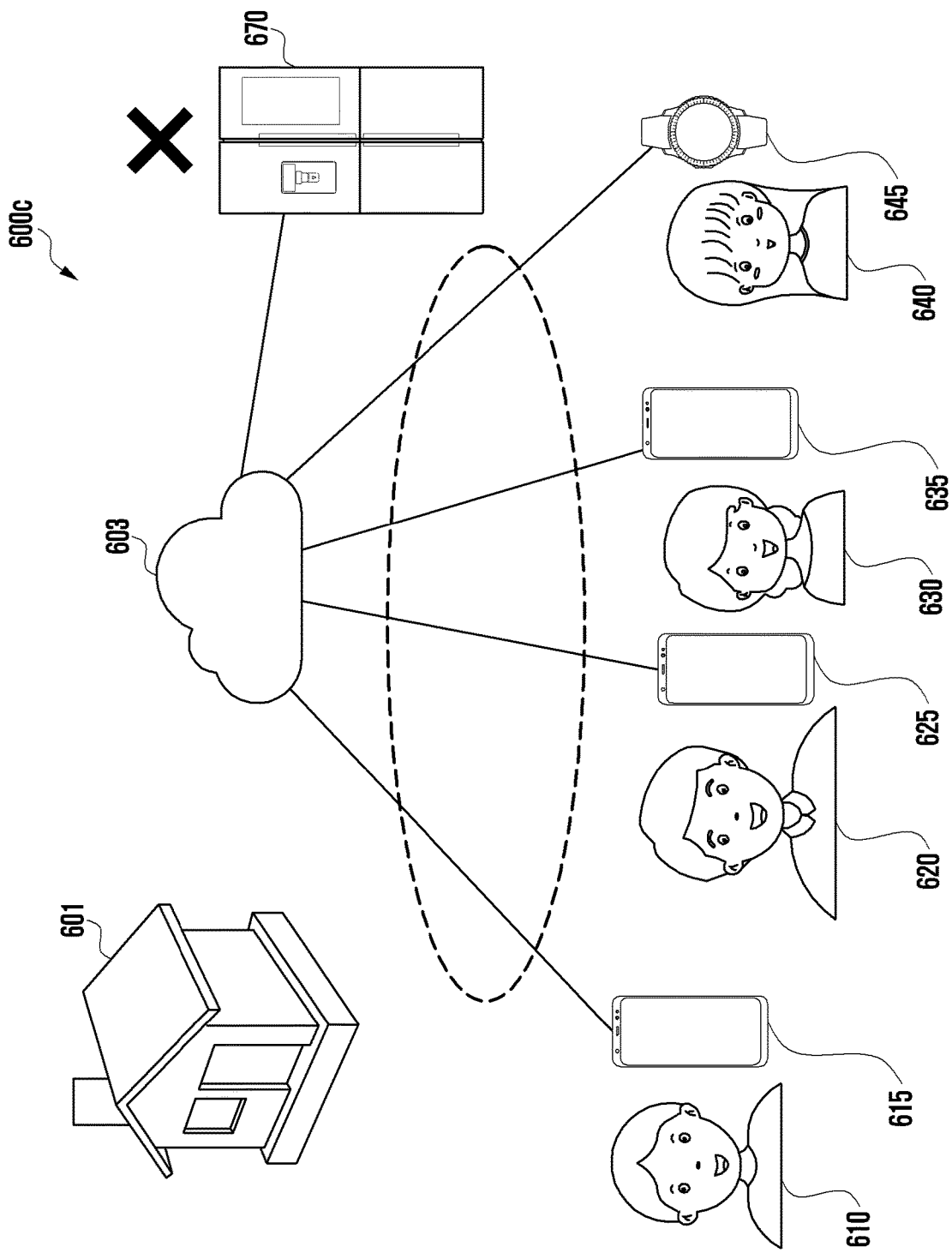
FIG. 6C is a diagram illustrating examples of operations of providing information by an electronic device, according to an embodiment.

FIG. 6A is a diagram illustrating examples of operations of providing information by an electronic device, according to an embodiment. FIG. 6B is a diagram illustrating examples of operations of providing information by an electronic device, according to an embodiment. FIG. 6C is a diagram illustrating examples of operations of providing information by an electronic device, according to an embodiment.

A system 600a, 600b, 600c that provides user guide information to a user may include an electronic device 603, a first external electronic device 615 of a first user 610, a second external electronic device 625 of the second user 620, a third external electronic device 635 of a third user 630, a fourth external electronic device 645 of a fourth user 640, and a fifth external electronic device 670. At least one of the electronic device 603, the first to fourth external electronic devices 615, 625, 635, 645, or the fifth external electronic device 670 may include at least a part of elements of the electronic device 101 illustrated in FIG. 1 and a part of elements of the electronic device 201 illustrated in FIG. 2.

The electronic device 603 may include a server, a cloud, or a service platform that communicates with the first to fifth external electronic devices 615, 625, 635, 645, 670. The first to fourth external electronic devices 615, 625, 635, 645 may include portable devices (e.g., a cellular phone or a tablet) or wearable devices (e.g., a smart watch and a smart band), which are used by the first to fourth users 610, 620, 630, 640, respectively. The fifth external electronic device 670 may include a home appliance (e.g., a smart refrigerator) located at a selected place 601 (e.g., houses of the first to fourth users 610, 620, 630, 640) associated with at least one among the first to fourth external electronic devices 615, 625, 635, 645. The selected place 601 may be place configured or selected via the first to fourth external electronic devices 615, 625, 635, 645 by the first to fourth users 610, 620, 630, 640, respectively.

The first external electronic device 615 may correspond to first user account information of the first user 610, the second external electronic device 625 may correspond to second user account information of the second user 620, the third external electronic device 635 may correspond to third user account information of the third user 630, and the fourth external electronic device 645 may correspond to fourth user account information of the fourth user 640. The electronic device 603 or the fifth external electronic device 670 may include group account information including the first to fourth user account information. If the first to fourth users 610, 620, 630, 640 are family, the group account information may be family account information including the first to fourth user account information. The first user account information may include information of electronic devices used by the first user 610 and information of a group account to which the first user 610 belongs.

The electronic device 603 may receive information of the first to fourth users 610, 620, 630, 640 from the first to fourth external electronic devices 615, 625, 635, 645, respectively. Information of a user may include biometric information or schedule information of the user. The biometric information of the user may include at least one of the user's heart rate, electrocardiogram, blood sugar, blood pressure, stress, calorie intake, calorie consumption, or health condition. The schedule information may include at least one of the user's meal plan, schedule, anniversary, or event.

The electronic device 603 may receive, from the fifth external electronic device 670, information sensed by the fifth external electronic device 670. The fifth external electronic device 670 may include a sensor module capable of monitoring inside of the fifth external electronic device 670. The fifth external electronic device 670 (e.g., refrigerator) may monitor ingredients stored therein.

The electronic device 603 may generate user guide information at least partially based on first user information, second user information, third user information, fourth user information, and information sensed by the fifth external electronic device 670. The user guide information may include a meal recipe corresponding to at least one among the first to fourth users 610, 620, 630, 640. The meal recipe may include at least a part of food-related information including at least one of a name of food, calories of the food, an amount of the food, a cooking method, a cooking time, or a nutrient of the food. The electronic device 603 may generate user guide information according to whether each of the first to fourth external electronic devices 615, 625, 635, 645 is located at the selected place 601. The electronic device 603 may determine user account information included in the group account information, and may generate user guide information based on whether the first to fourth external electronic devices 615, 625, 635, 645 corresponding to the respective pieces of first to fourth user account information included in the group account information are located in the selected place 601.

FIG. 6A illustrates a case where all of the first to fourth external electronic devices 615, 625, 635, 645 are located at the selected place 601. The electronic device 603 may generate user guide information based on information of the first user 610, information of the second user 620, information of the third user 630, and information of the fourth user 640. The electronic device 603 may generate a meal recipe optimized to all of the first to fourth users 610, 620, 630, 640 based on biometric information (e.g., blood sugar, calorie consumption, and health condition) of all of the first user 610, the second user 620, the third user 630, and the fourth user 640 and schedule information (e.g., meal plans of the first to fourth users 610, 620, 630, 640) of all of the first user 610, the second user 620, the third user 630, and the fourth user 640. The electronic device 603 may generate a meal recipe suitable for the first user 610, a meal recipe suitable for the second user 620, a meal recipe suitable for the third user 630, a meal recipe suitable for the fourth user 640, and a meal recipe in consideration of all of the first to fourth users 610, 620, 630, 640.

The electronic device 603 may generate user guide information based on sensing information obtained by monitoring inside of the fifth external electronic device 670, which is received from the fifth external electronic device 670. When the electronic device 603 receives sensing information relating to ingredients stored inside the fifth external electronic device 670 (e.g., a refrigerator), the electronic device 603 may generate a meal recipe in consideration of the ingredients stored in the fifth external electronic device 670 when generating user guide information (e.g., a meal recipe). The electronic device 603 may generate a meal recipe based on information of the first to fourth users 610, 620, 630, 640, and when ingredients stored in the fifth external electronic device 670 (e.g., a refrigerator) is insufficient for the generated meal recipe, the electronic device 603 may request a corresponding service from an external service (e.g., an external item purchase service or an external item delivery service). The first to fourth user account information or group account information may include at least one piece of payment information (e.g., account information, card information, or authentication information of at least one of the first to fourth users 610, 620, 630, 640). The electronic device 603 may request a purchase or delivery of an insufficient item (ingredients) from an external service based on the payment information included in the group account information.

The electronic device 603 may allow the fifth external electronic device 670 to display the generated user guide information. The electronic device may allow the fifth external electronic device 670 to display the user guide information at a configured time based on the schedule information (e.g., a meal plan) of the first to fourth users 610, 620, 630, 640. The electronic device 603 may allow the fifth external electronic device 670 to display the user guide information in response to reception of information indicating that at least one of the first to fourth external electronic devices 615, 625, 635, 645 is located at the selected place 601. The electronic device 603 may allow the fifth external electronic device 670 to display the user guide information in response to reception of an input for requesting of the user guide information via the fifth external electronic device 670. The electronic device 603 may allow a display device (e.g., at least one display among another home appliance device located at the selected place 601, a nearable device, and the first to fourth external electronic devices 615, 625, 635, 645) other than the fifth external electronic device 670 to display the user guide information.

FIG. 6B illustrates a case where the second external electronic device 625 and the third external electronic device 635 are located at the selected place 601, and the first external electronic device 615 and the fourth external electronic device 645 are not present at the selected place 601. The electronic device 603 may generate user guide information based on information of the second user 620 and information of the third user 630. The electronic device 603 may generate a meal recipe optimized to the second user 620 and the third user 630 based on biometric information (e.g., blood sugar, calorie consumption, and health condition) of the second user 620 and the third user 630 and schedule information (e.g., meal plans of the second user 620 and the third user 630) of the second user 620 and the third user 630. The electronic device 603 may generate a meal recipe suitable for the second user 620, a meal recipe suitable for the third user 630, and a meal recipe suitable for both of the second user 620 and the third user 630. The electronic device 603 may receive location information of each of the first to fourth external electronic devices 615, 625, 635, 645 repeatedly or at configured intervals. Even when at least one of the first to fourth external electronic devices 615, 625, 635, 645 is not located at the selected place 601, if it is recognized that an external electronic device (e.g., the first external electronic device 615 or the fourth external electronic device 645, in FIG. 6B) that is not located at the selected place is moving to the selected place 601, the electronic device 603 may generate user guide information by further considering user information of the external electronic device that is moving to the selected place 601. In the case of FIG. 6B, even if only the second external electronic device 625 and the third external electronic device 635 are located at the selected place 601, if it is recognized that the first external electronic device 615 is moving to the selected place 601, the electronic device 603 may generate user guide information based on information of the first user 610, information of the second user 620, and information of the third user 630. The electronic device 603 may transmit a request for confirming whether an external electronic device (e.g., the first external electronic device 615 or the fourth external electronic device 645) which is not located at the selected place 601 is planning to be present at the selected place 601 at a configured time (e.g., a configured time according to schedule information of the first to fourth users 610, 620, 630, 640. When the electronic device 603 receives information indicating that an external electronic device (e.g., the first external electronic device 615 or the fourth external electronic device 645) which is not located at the selected place 601 will be located at the selected place 601 at a configured time, the electronic device 603 may generate user guide information in consideration of user information of the corresponding external electronic device.

The electronic device 603 may allow the fifth external electronic device 670 to display the generated user guide information. The electronic device 603 may allow the fifth external electronic device 670 to display user guide information at a configured time based on schedule information (e.g., a meal plan) of the second user 620 and the third user 630. The electronic device 603 may allow the fifth external electronic device 670 to display user guide information in response to reception of information indicating that at least one of the second external electronic device 625 or the third external electronic device 635 is located at the selected place 601. The electronic device 603 may allow the fifth external electronic device 670 to display the user guide information in response to reception of an input for requesting of the user guide information via the fifth external electronic device 670. The electronic device 603 may allow a display device (e.g., at least one display of another home appliance device located at the selected place 601, a nearable device, the second external electronic device 625, or the third external electronic device 635) other than the fifth external electronic device 670 to display user guide information. In the case of FIG. 6B, because only the second external electronic device 625 and the third external electronic device 635 are located at the selected place 601, the electronic device 603 may generate user guide information different from that of the case of FIG. 6A, in which all of the first to fourth external electronic devices 615, 625, 635, 645 are located at the selected place, or may allow the fifth external electronic device 670 (or other display devices) to display user guide information different from that of the case of FIG. 6A.

FIG. 6C illustrates a case where all of the first to fourth external electronic devices 615, 625, 635, 645 are not located at the selected place 601. The electronic device 603 may prevent the fifth external electronic device 670 (or other display devices) from displaying user guide information. The electronic device 603 may generate, as in the case of FIG. 6A, user guide information (e.g., a meal recipe) according to the first to fourth users 610, 620, 630, 640 or a combination of each of the users, but may prevent the fifth external electronic device 670 from displaying the user guide information. When it is confirmed that at least one of the first to fourth external electronic devices 615, 625, 635, 645 is located at the selected place 601 or is moving to the selected place 601, the electronic device 603 may allow the fifth external electronic device 670 (or other display devices) to display user guide information.

After generating user guide information (e.g., a meal recipe) for the first to fourth users 610, 620, 630, 640 corresponding to the respective pieces of user account information (account information of the first to fourth users 610, 620, 630, 640) included in the group account information and user guide information according to a combination of the first to fourth users, the electronic device 603 may control the fifth external electronic device 670 to display different user guide information according to whether each of the first to fourth external electronic devices 615, 625, 635, 645 is located at the selected place 601. In the case of FIG. 6A, if all of the first to fourth external electronic devices 615, 625, 635, 645 are located at the selected place 601 (e.g., a house), the electronic device 603 may select a most suitable meal recipe in consideration of all of the first to fourth users 610, 620, 630, 640 and may allow the fifth external electronic device 670 to display the selected meal recipe. In the case of FIG. 6B, if only the second external electronic device 625 and the third external electronic device 635 are located at the selected place 601, the electronic device 603 may select a meal recipe most suitable for the second user 620 and the third user 630 from the generated user guide information, and may allow the fifth external electronic device 670 to display the selected meal recipe. In the case of FIG. 6C, if all of the first to fourth external electronic devices 615, 625, 635, 645 are not present at the selected place 601, the electronic device 603 may prevent the fifth external electronic device 670 from displaying user guide information.

According to an embodiment, an electronic device may include a communication interface configured to communicate with at least one external electronic device, at least one processor operatively connected to the communication interface, and at least one memory operatively connected to the processor. The memory may store instructions that, when executed, cause the processor to receive first user information from a first external electronic device by the communication interface, receive second user information from a second external electronic device by the communication interface, receive information sensed by a third external electronic device, which is located at the selected place associated with at least one of the first external electronic device or the second external electronic device, from the third external electronic device by the communication interface, generate user guide information at least partially based on the received first user information, second user information, and sensed information, receive, by the communication interface, at least one of information indicating that the first or second external electronic device is located at the selected place, and a user input for requesting of the user guide information via the third external electronic device, and in response to at least one of the received information and the user input, display the user guide information via a display device located at the selected place.

Information of the first user may include at least a part of schedule information or biometric information of the first user, which is measured by the first external electronic device.

The third external electronic device may further include a sensor module configured to monitor inside of the third external electronic device, and the sensed information may be information acquired by the sensor module.

The biometric information of the first user may include at least one among the first user's heart rate, electrocardiogram, blood sugar, blood pressure, stress, calorie intake, calorie consumption, and health condition.

The schedule information of the first user may include at least one among the first user's meal plan, schedule, anniversary, and event.

The user guide information may include a meal recipe corresponding to at least one of the first user or the second user.

The instructions, when executed, further cause the processor to allow difference user guide information to be displayed via the display device according to whether the first external electronic device or the second external electronic device is located at the selected place.

The first external electronic device may correspond to first user account information of the first user, the second external electronic device may correspond to second user account information of the second user, and the instructions, when executed, further cause the processor to generate the guide information at least partially based on group account information including the first user account information and the second user account information.

According to an embodiment, an electronic device may include a communication interface configured to communicate with at least one external electronic device, at least one processor operatively connected to the communication interface, and at least one memory operatively connected to the processor. The memory may store instructions that, when executed, cause the processor to receive biometric information of a first user from the first external electronic device by the communication interface, receive information sensed by the second external electronic device, which is located at the selected place associated with the first external electronic device, from the second external electronic device by the communication interface, generate user guide information at least partially based on the received biometric information of the first user and sensed information, receive, by the communication interface, at least one of information indicating that the first external electronic device is located at the selected place and a user input for requesting of the user guide information via the second external electronic device, and in response to at least one of the received information and the user input, display the user guide information via a display device located at the selected place.

The second external electronic device may further include a sensor module configured to monitor inside of the second external electronic device, and the sensed information may be information acquired by the sensor module.

Figure 7:
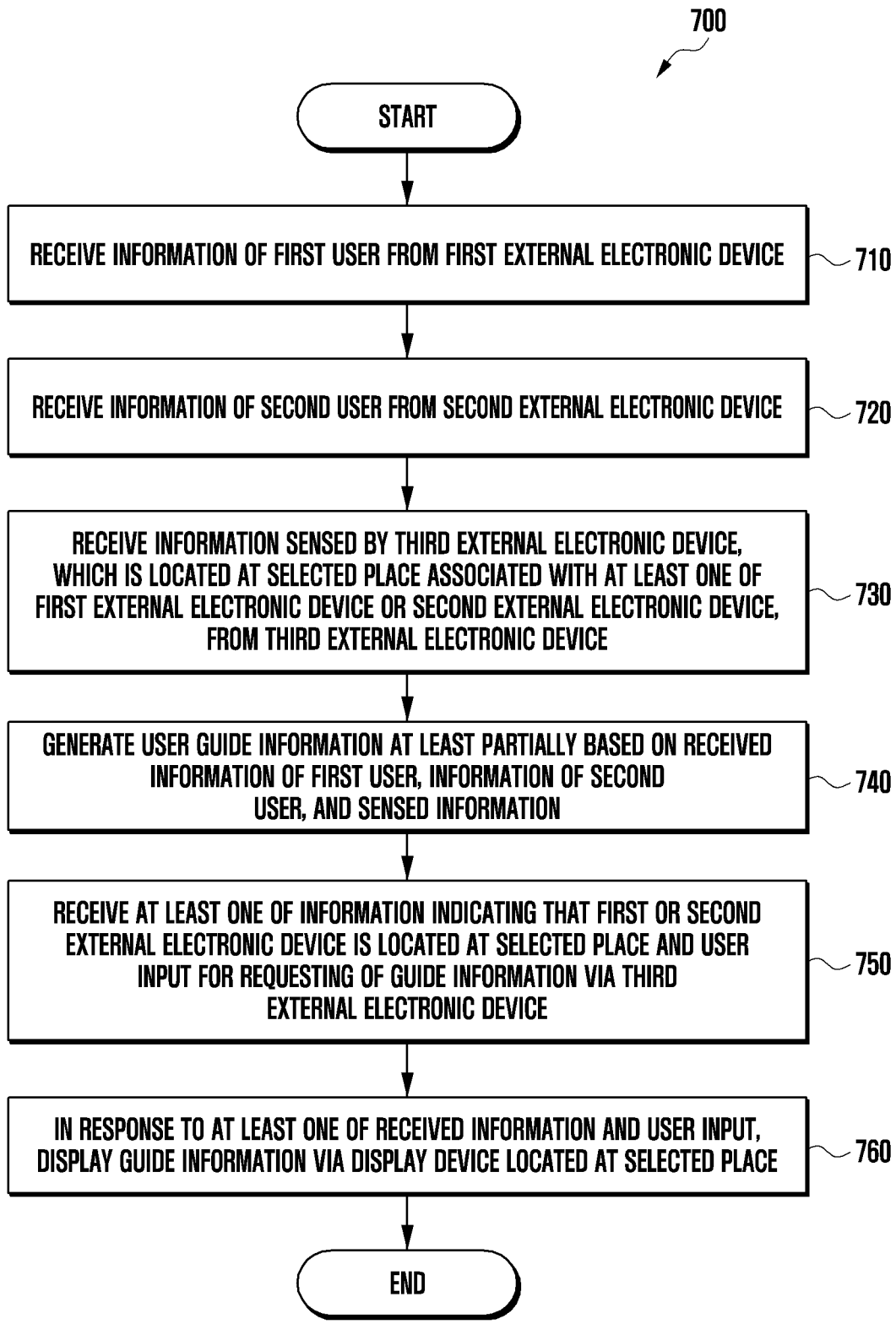
FIG. 7 is a flowchart illustrating a method for providing information by an electronic device according to an embodiment.

FIG. 7 is a flowchart illustrating a method for providing information by an electronic device, according to an embodiment.

In operation 710, an electronic device may receive first user information from a first external electronic device. The first external electronic device may include a portable electronic device (e.g., a smartphone or a tablet) or a wearable device (e.g., a smart watch or a smart band). The first external electronic device may include at least a part of elements of the electronic device 101, 102 illustrated in FIG. 1 or FIG. 2.

The first user information may include biometric information or schedule information of a first user. The biometric information of the first user may include at least one of the first user's heart rate, electrocardiogram, stress, calorie intake, calorie consumption, blood pressure, blood sugar, or health condition (e.g., a disease state), but is not limited thereto. Further, the biometric information may include various biometric information. The schedule information of the first user may include at least one of the first user's meal plan, schedule, anniversary, or event, but is not limited thereto. Further, the schedule information may include various information related to the first user. The first user's meal plan may include information relating to a menu or type of a meal (food) desired by the first user or information relating to a meal time desired by the first user.

In operation 720, the electronic device may receive second user information from a second external electronic device. The second external electronic device may include a portable electronic device (e.g., a smartphone or a tablet) or a wearable device (e.g., a smart watch or a smart band). The second external electronic device may include at least a part of elements of the electronic device 101, 102 illustrated in FIG. 1 or FIG. 2. The second user's meal plan may include information relating to a menu or type of a meal desired by the second user or information relating to a meal time desired by the second user.

The second user information may include biometric information or schedule information of the second user. The second user's biometric information may include at least one of the second user's heart rate, electrocardiogram, stress, calorie intake, calorie consumption, blood pressure, or blood sugar, but is not limited thereto. Further, the biometric information may include various biometric information. The schedule information of the second user may include at least one of the second user's meal plan, schedule, anniversary, or event, but is not limited thereto. Further, the schedule information may include various information related to the second user.

In operation 730, the electronic device may receive information sensed by a third external electronic device, which is located at a selected place associated with at least one of the first external electronic device or the second external electronic device, from the third external electronic device.

The selected place may include a house or office of the first user or second user, which is associated with the first external electronic device or the second external electronic device. The selected place may be a place registered or configured by the first user or the second user via the first external electronic device or the second external electronic device.

The third external electronic device may include various home appliances (e.g., a smart refrigerator or a smart television (TV)). The third external electronic device may include various IoT devices.

If the third external electronic device is a refrigerator, the third external electronic device may monitor ingredients stored therein via a sensor module. The third external electronic device may sense information of the ingredients stored therein, and may transmit the sensed information to the electronic device.

In operation 740, the electronic device may generate user guide information at least partially based on the received first user information, second user information, and sensed information.

The electronic device may generate the user guide information suitable for the first user and the second user based on schedule information (e.g., a meal plan) and biometric information (e.g., blood sugar) of the first user, schedule information and biometric information of the second user, and sensing information (e.g., information of held ingredients) of the third external electronic device (e.g., refrigerator). The guide information may include a meal recipe corresponding to at least one of the first user or the second user. The meal recipe may include a type (menu), quantity, and cooking method of a dish suitable for each of the first user and second user. If both the first external electronic device and the second external electronic device are located at the selected place (e.g., if the first user and the second user have a meal together), the electronic device may determine a dish suitable for the first user and the second user based on the first user information, the second user information, and ingredients held in the third external electronic device, and may generate, as user guide information, a recipe of the determined dish.

The electronic device may generate different guide information according to whether the first external electronic device and the second external electronic device is located at the selected place (e.g., a house of the first or second user). If only the first external electronic device is located at the selected place, the electronic device may generate user guide information only for the first user. If only the second external electronic device is located at the selected place, the electronic device may generate user guide information only for the second user. When both the first and second external electronic devices are located at the selected place, the electronic device may generate suitable user guide information in consideration of both the first user and the second user. If only the first external electronic device (or the second external electronic device) is located at the selected place, the electronic device may determine a type and quantity of a dish suitable for the first user (or the second user) by considering information (e.g., schedule information or biometric information of the first user (or the second user)) of the first user (or the second user), and may generate a recipe therefor as user guide information. If both the first and second external electronic devices are located at the selected place, the electronic device may determine a type and quantity of a dish suitable for both the first user and the second user based on the first user information and the second user information, and may generate a recipe therefor as user guide information.

The electronic device may generate guide information based on a climate condition (e.g., season, weather, and climate) or other information (e.g., county, culture, and religion) of the first user or the second user.

In operation 750, the electronic device may receive at least one among a user input for requesting of the user guide information via the third external electronic device and information indicating that the first or second external electronic device is located at the selected place. The electronic device may receive, from the first or second external electronic device, information indicating that the first or second external electronic device is located at the selected place. If the third external electronic device receives, from a user, a user input for requesting of the user guide information, the electronic device may receive, from the third external electronic device, a user input in response to the request.

In operation 760, the electronic device may display guide information via a display device located at the selected place in response to at least one of the received information or the user input. The electronic device may transmit the generated user guide information to an external display device, and may control the display device to display the user guide information. The display device may include the first external electronic device, the second external electronic device, or the third external electronic device. The electronic device may control the user guide information to be displayed via the first external electronic device, the second external electronic device, or the third external electronic device, which is located at the selected place.

FIG. 8 is a flowchart illustrating a method for providing information by an electronic device, according to an embodiment.

In operation 810, an electronic device may receive biometric information of a first user from a first external electronic device. The first external electronic device may include a portable electronic device (e.g., a smartphone or a tablet) or a wearable device (e.g., a smart watch or a smart band). The first external electronic device may include at least a part of elements of the electronic device 101, 102 illustrated in FIG. 1 or FIG. 2.

The biometric information of the first user may include at least one of the first user's heart rate, electrocardiogram, stress, calorie intake, calorie consumption, blood pressure, blood sugar, or health condition (e.g., a disease state, and the presence or absence of an allergy), but is not limited thereto. Further, the biometric information may include various biometric information.

The electronic device may receive schedule information of the user from the first external electronic device. The schedule information may include at least one of the first user's meal plan, schedule, anniversary, or event.

In operation 820, the electronic device may receive information sensed by a second external electronic device, which is located at a selected place associated with the first external electronic device, from the second external electronic device.

The selected place may include a house or office of the first user, which is associated with the first external electronic device. The selected place may be a place configured or registered by the first user via the first external electronic device.

The second external electronic device may include various home appliances (e.g., a smart refrigerator or a smart TV). According to various embodiments, the second external electronic device may include various IoT devices.

If the second external electronic device is a refrigerator, the second external electronic device may monitor ingredients stored therein via a sensor module. The second external electronic device may sense information of the ingredients stored therein, and may transmit the sensed information to the electronic device.

In operation 830, the electronic device may generate user guide information at least partially based on the received biometric information of the first user and sensed information. The electronic device may generate user guide information suitable for the first user based on the biometric information (e.g., blood sugar) of the first user and the sensing information (e.g., information of held ingredients) of the second external electronic device (e.g., a refrigerator). The guide information may include a meal recipe corresponding to the first user. For example, the meal recipe may include a type (menu), quantity, and cooking method of a dish suitable for the first user.

The electronic device may generate guide information based on schedule information of the first user, which is received from the first external electronic device. The electronic device may generate guide information based on a climate condition (season, weather, and climate) or other information (e.g., country, culture, and religion) of the first user.

In operation 840, the electronic device may receive at least one among a user input for requesting of the user guide information via the second external electronic device and information indicating that the first external electronic device is located at the selected place.

The electronic device may receive, from the first external electronic device, information indicating that the first external electronic device is located at the selected place. If the second external electronic device receives, from a user, a user input for requesting of the user guide information, the electronic device may receive, from the second external electronic device, a user input in response to the request.

In operation 850, the electronic device may display guide information via a display device located at the selected place in response to at least one of the received information or the user input.

The electronic device may transmit the generated user guide information to an external display device, and may control the display device to display the user guide information. The display device may include the first external electronic device and the second external electronic device. The electronic device may control the user guide information to be displayed via the display of the first external electronic device or second external electronic device which is located at the selected place.

Figure 9A:
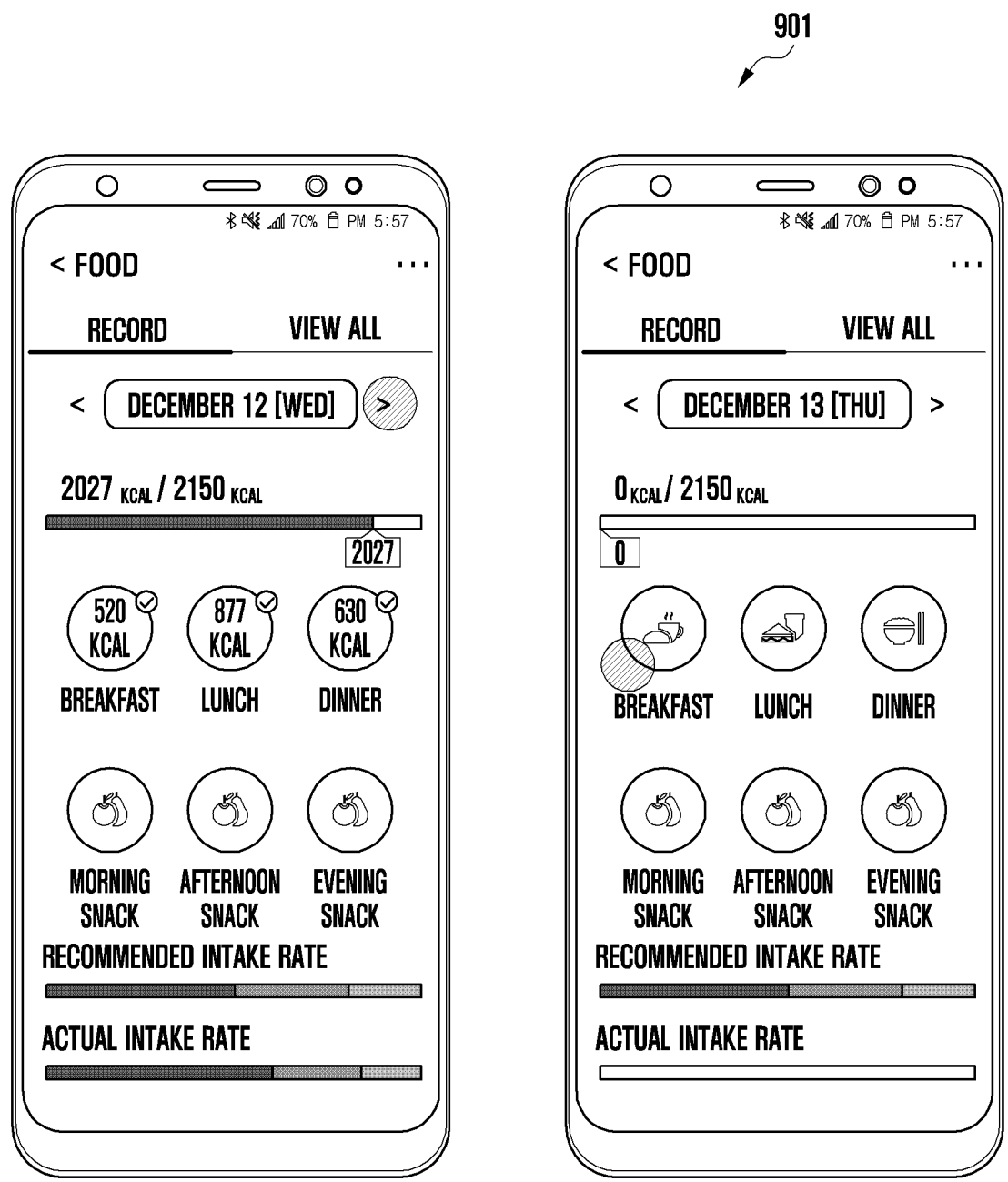
FIG. 9A is a diagram illustrating an operation of an electronic device, according to an embodiment.
Figure 9B:
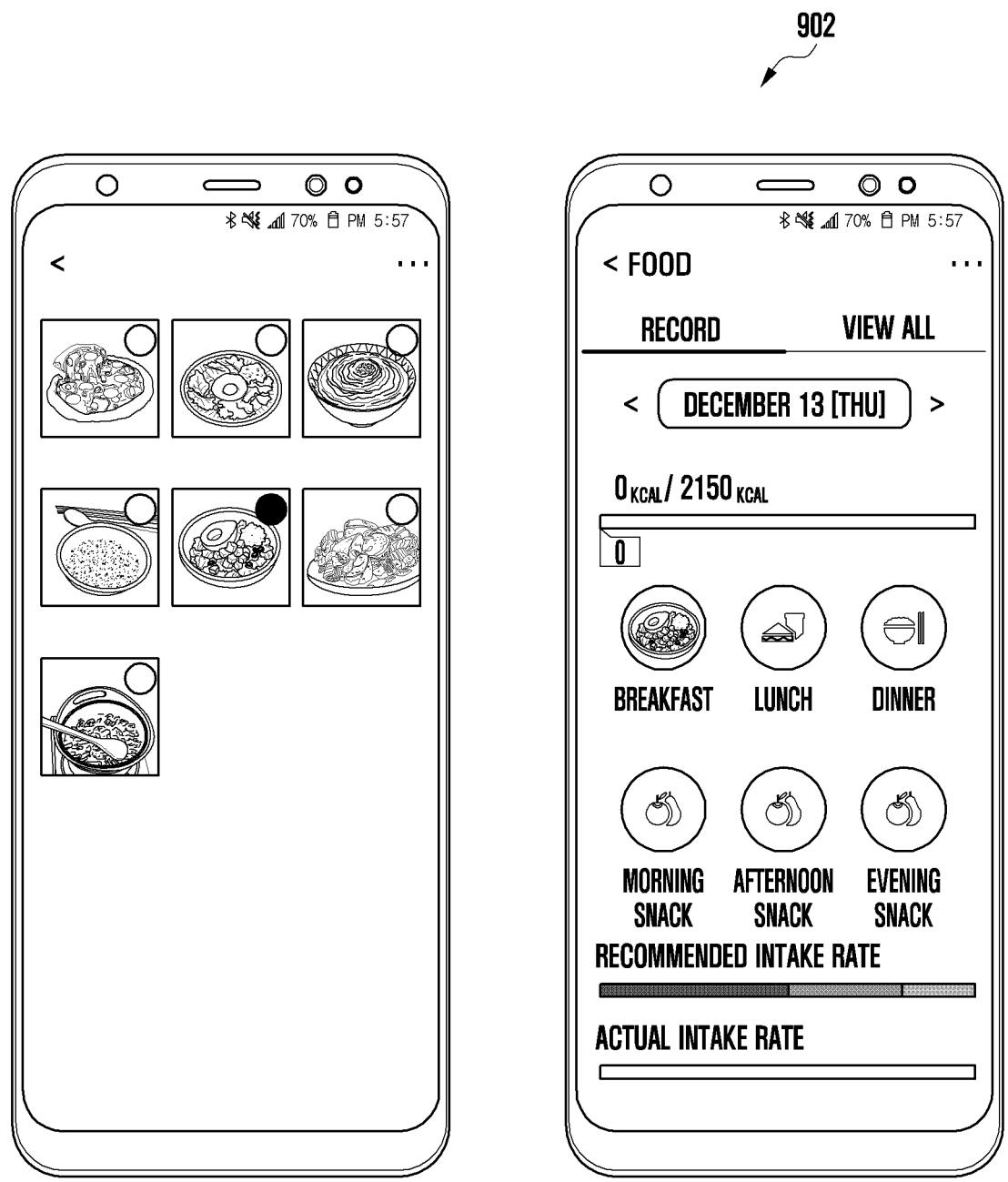
FIG. 9B is a diagram illustrating an operation of an electronic device according to an embodiment.

FIG. 9A is a diagram illustrating an operation of an electronic device, according to an embodiment. FIG. 9B is a diagram illustrating an operation of an electronic device, according to an embodiment.

FIG. 9A illustrates an operation of receiving a meal plan from a user by an electronic device (e.g., any of the electronic devices of FIGS. 1 through 6), and FIG. 9B illustrates an operation of receiving a meal plan from a user by an electronic device (e.g., any of the electronic devices of FIGS. 1 through 6).

The electronic device (e.g., a smartphone, a tablet, and a smart watch) may receive, from a user, schedule information of the user. Referring to FIG. 9A, the electronic device may display information associated with schedule information (e.g., a meal plan) of the user. Referring to 910, the electronic device may display a preconfigured or pre-input meal plan of the user. The electronic device may display the user's food intake information (e.g., ingested food or intake calories) or a meal plan configured for a specific date and/or a specific meal time. The electronic device may display nutrition information (e.g., recommended calorie intake amount) recommended to the user at least partially based on the biometric information of the user. The electronic device may display the amount of calories actually ingested by the user, as a graph or a numerical value with respect to the recommended amount of calorie intake of the user. In 910, the electronic device may display a graph indicating that the user has currently consumed 2027 Kcal out of the recommended daily calories of 2150 Kcal on December 12. In 920, the electronic device may display a graph indicating that there is no calorie intake out of the recommended daily calories of 2150 Kcal on December 13 that is the next day. The electronic device may display an amount of food and calories actually consumed by the user according to a meal plan (e.g., breakfast, lunch, dinner, or snack). The electronic device may display an amount of calories ingested by the user based on a configured meal plan (e.g., breakfast, lunch, dinner, or snack), via the graph of a recommended intake rate or actual intake rate.

The electronic device may receive an input for selecting a date from the user. The electronic device may change and display a date for configuration of a meal plan according to an input touch of the user.

Referring to 920, the electronic device may display another date (e.g., a date for which the user desires to configure a meal plan) and a meal plan screen for the corresponding date, according to an input of the user. The electronic device may receive, from the user, an input for selecting a specific meal menu of the corresponding date. Referring to 920, the electronic device may receive, from the user, an input for configuring breakfast on the selected date (Thursday, December 13).

Referring to 930 of FIG. 9B, the electronic device may display at least one meal menu in response to the input for configuring a breakfast plan of the user. The electronic device may display an image of a dish, nutrition information, a name of the dish, a cooking method, or a combination thereof. The electronic device may display a recommended meal menu based on biometric information of the user or other schedule information (e.g., anniversary information of the user) of the user. The electronic device may determine the priority of recommended meal menus according to a degree suitable for the user, at least partially based on the biometric information of the user, and may display the recommended meal menus in order. The electronic device may determine recommended meal menus based on the biometric information of the user, may determine nutrition scores for the respective recommended meal menus, and may display the recommended menus in order of the determined nutrition scores. The electronic device may receive, from the user, an input of selecting a specific meal menu.

Referring to 940, the electronic device may configure a meal menu selected by the user, as a selected meal plan for a corresponding date. In 930, the electronic device may configure the selected meal menu as a breakfast plan (a breakfast menu) for the date (December 13). In 940, the electronic device may display a graph indicating calories ingested by the user on the date (December 13). The electronic device may display a graph indicating that the user has ingested 0 Kcal out of the recommended daily calories of 2150 Kcal on the date (December 13).

Figure 10A:
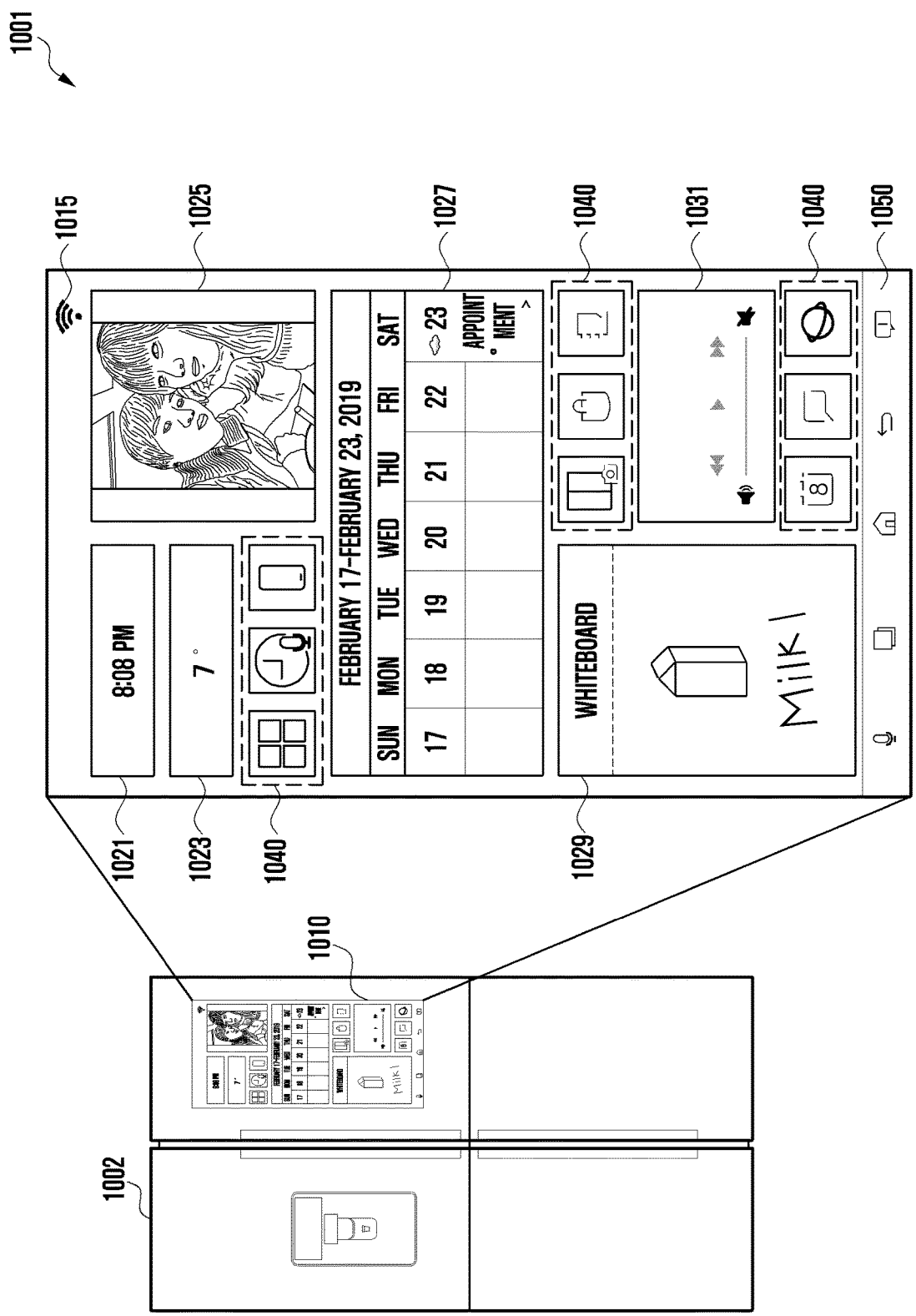
FIG. 10A is a diagram illustrating an operation of another electronic device, according to an embodiment.

FIG. 10A is a diagram illustrating an operation of an electronic device, according to an embodiment. FIG. 10B is a diagram of an operation of an electronic device, according to an embodiment.

FIG. 10A illustrates an example 1001 of displaying a user's meal plan by an electronic device 1002 (e.g., any of the electronic devices of FIGS. 1 through 6).

Referring to FIG. 10A, the electronic device 1002 may include a display 1010. As illustrated in 1001, the electronic device 1002 may display, on the display 1010, a state (e.g., a communication connection state) 1015 of the electronic device 1002, a date and time 1021, weather 1023, and a user's schedule 1027, an image or photo 1025, a memo (white board) 1029, a content 1031, at least one application execution icon 1040, or an operation area 1050.

The electronic device (e.g., a smart refrigerator) 1002 may display, on the display 1010, configured schedule information (e.g., a meal plan) of a user. The electronic device 1002 may display a meal plan configured for a current date or a current week on the display 1010. The electronic device 1002 may display the configured meal plan on the display 1010 according to the user's input or the presence or absence of the user (e.g., whether the user (or the user's mobile device or wearable device) is present at a configured place where the electronic device is located).

The electronic device 1002 may receive, from the user, an input of selecting a specific date or day of the week. The electronic device 1002 may display meal plan information of the specific date in more detail in response to the input received from the user. The electronic device 1002 may display an interface for configuring a meal menu included on a specific date, recommended calories, calories consumed, recently ingested food information (e.g., food images), remaining calories (i.e., ingested calories-consumed calories), or an additional meal plan.

FIG. 10B illustrates examples 1003 in which the electronic device 1002 displays, on the display 1010, a meal plan of a user according to whether a user input or the user (or another electronic device of the user) is present at a configured place where the electronic device 1002 is located.

Referring to 1060, the electronic device 1002 may display, on the display 1010, a list of meal menus recommended for the user. The electronic device 1002 may display food related information, or a name, an image, a cooking time, or calories of food recommended for the user. The electronic device may further provide information related to a selected food according to a user input. The electronic device 1002 may provide a web page, news, an article, an advertisement, or a service (e.g., a purchase service or a delivery service), which is related to the selected food, according to a user input.

Referring to 1070, the electronic device 1002 may display a recipe of a specific food based on the user's selection or a configured meal plan of the user. The electronic device 1002 may display ingredients, a cooking method, a cooking order, etc. of the specific food.

The disclosure is not limited to those illustrated in FIG. 10A and FIG. 10B, and the electronic device 1002 may display, on the display 1010, a food name, a food image, or associated information according to a meal plan configured for a specific day of the week. The electronic device may display, on the display 1010, internal information (e.g., information of held ingredients) of the electronic device 1002, which is obtained by monitoring by a sensor.

The electronic device may display a meal plan configuration menu illustrated in FIG. 9 according to a user input configured while displaying the screen illustrated in FIG. 10A or FIG. 10B.

According to an embodiment, an operation method of an electronic device may include receiving information of a first user from a first external electronic device, receiving information of a second user from a second external electronic device, receiving information sensed by a third external electronic device, which is located at a selected place associated with at least one of the first external electronic device or the second external electronic device, from the third external electronic device, generating user guide information at least partially based on the received information of the first user, information of the second user, and sensed information, receiving at least one of information indicating that the first or second external electronic device is located at the selected place, and a user input for requesting of the user guide information via the third external electronic device, and in response to at least one of the received information or the user input, displaying the user guide information via a display device located at the selected place.

The first user information may include at least a part of schedule information or biometric information of the first user, which is measured by the first external electronic device.

The sensed information may be information acquired by a sensor module configured to monitor inside of the third external electronic device.

The biometric information of the first user may include at least one among the first user's heart rate, electrocardiogram, blood sugar, blood pressure, stress, calorie intake, calorie consumption, and health condition.

The schedule information of the first user may include at least one among the first user's meal plan, schedule, anniversary, and event.

The user guide information may include a meal recipe corresponding to at least one of the first user or the second user.

The displaying of the user guide information may include allowing different user guide information to be displayed via the display device according to whether the first external electronic device or the second external electronic device is located at the selected place.

The first external electronic device may correspond to first user account information of the first user, the second external electronic device may correspond to second user account information of the second user, and generating of the user guide information may include generating the guide information at least partially based on group account information including the first user account information and the second user account information.

According to an embodiment, an operation method of an electronic device may include receiving biometric information of a first user from a first external electronic device, receiving information sensed by a second external electronic device, which is located at a selected place associated with the first external electronic device, from the second external electronic device, generating user guide information at least partially based on the received biometric information of the first user and sensed information, receiving at least one of information indicating that the first external electronic device is located at the selected place and a user input for requesting of the user guide information via the second external electronic device, and in response to at least one of the received information or the user input, displaying the user guide information via a display device located at the selected place.

The sensed information may be information acquired by a sensor module configured to monitor inside of the second external electronic device.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof

What is claimed is:

1. An electronic device, comprising:
    a communication interface configured to communicate with at least one external electronic device;
    at least one processor operatively connected to the communication interface; and
    at least one memory operatively connected to the processor, wherein the memory stores instructions that, when executed, cause the processor to:
        receive information of a first user from a first external electronic device by the communication interface;
        receive information of a second user from a second external electronic device by the communication interface;
        receive information sensed by a third external electronic device, which is located at a selected place associated with at least one of the first external electronic device or the second external electronic device, from the third external electronic device by the communication interface;
        generate user guide information at least partially based on the received information of the first user, information of the second user, and sensed information;
        receive, by the communication interface, at least one of information indicating that the first or second external electronic device is located at the selected place, and a user input for requesting of the user guide information via the third external electronic device; and
        in response to at least one of the received information or the user input, display the user guide information via a display device located at the selected place.

2. The electronic device of claim 1, wherein the information of the first user comprises at least a part of schedule information or biometric information of the first user, which is measured by the first external electronic device.

3. The electronic device of claim 1, wherein the third external electronic device further comprises a sensor module configured to monitor inside of the third external electronic device, and the sensed information is information acquired by the sensor module.

4. The electronic device of claim 2, wherein the biometric information of the first user comprises at least one of the first user's heart rate, electrocardiogram, blood sugar, blood pressure, stress, calorie intake, calorie consumption, or health condition.

5. The electronic device of claim 2, wherein the schedule information of the first user comprises at least one of the first user's meal plan, schedule, anniversary, or event.

6. The electronic device of claim 1, wherein the user guide information comprises a meal recipe corresponding to at least one of the first user or the second user.

7. The electronic device of claim 1, wherein the instructions, when executed, further cause the processor to display different user guide information via the display device according to whether the first external electronic device or the second external electronic device is located at the selected place.

8. The electronic device of claim 1, wherein the first external electronic device corresponds to first user account information of the first user, the second external electronic device corresponds to second user account information of the second user, and the instructions, when executed, further cause the processor to generate the guide information at least partially based on group account information comprising the first user account information and the second user account information.

9. An electronic device, comprising:
    a communication interface configured to communicate with at least one external electronic device;
    at least one processor operatively connected to the communication interface; and
    at least one memory operatively connected to the processor, wherein the memory stores instructions that, when executed, cause the processor to:
        receive biometric information of the first user from a first external electronic device by the communication interface;
        receive information sensed by a second external electronic device, which is located at a selected place associated with the first external electronic device, from the second external electronic device by the communication interface;
        generate user guide information at least partially based on the received biometric information of the first user and sensed information;
        receive, by the communication interface, at least one of information indicating that the first external electronic device is located at the selected place and a user input for requesting of the user guide information via the second external electronic device; and
        in response to at least one of the received information or the user input, display the user guide information via a display device located at the selected place.

10. The electronic device of claim 9, wherein the second external electronic device further comprises a sensor module configured to monitor inside of the second external electronic device, and the sensed information is information acquired by the sensor module.

11. An operation method of an electronic device, the method comprising:
    receiving information of a first user from a first external electronic device;
    receiving information of a second user from a second external electronic device;

receiving information sensed by a third external electronic device, which is located at a selected place associated with at least one of the first external electronic device or the second external electronic device, from the third external electronic device;

generating user guide information at least partially based on the received information of the first user, information of the second user, and sensed information;

receiving at least one of information indicating that the first or second external electronic device is located at the selected place, and a user input for requesting of the user guide information via the third external electronic device; and in response to at least one of the received information or the user input, displaying the user guide information via a display device located at the selected place.

12. The method of claim 11, wherein the information of the first user comprises at least a part of schedule information or biometric information of the first user, which is measured by the first external electronic device.

13. The method of claim 11, wherein the sensed information is information acquired by a sensor module configured to monitor inside of the third external electronic device.

14. The method of claim 12, wherein the biometric information of the first user comprises at least one of the first user's heart rate, electrocardiogram, blood sugar, blood pressure, stress, calorie intake, calorie consumption, or health condition.

15. The method of claim 12, wherein the schedule information of the first user comprises at least one of the first user's meal plan, schedule, anniversary, or event.

16. The method of claim 11, wherein the user guide information comprises a meal recipe corresponding to at least one of the first user or the second user.

17. The method of claim 11, wherein displaying the user guide information comprises displaying different user guide information via the display device according to whether the first external electronic device or the second external electronic device is located at the selected place.

18. The method of claim 11, wherein the first external electronic device corresponds to first user account information of the first user, the second external electronic device corresponds to second user account information of the second user, and generating the user guide information comprises generating the guide information based on group account information comprising the first user account information and the second user account information.

19. An operation method of an electronic device, the method comprising:
receiving biometric information of a first user from a first external electronic device;

receiving information sensed by a second external electronic device, which is located at a selected place associated with the first external electronic device, from the second external electronic device;

generating user guide information at least partially based on the received biometric information of the first user and sensed information;

receiving at least one of information indicating that the first external electronic device is located at the selected place and a user input for requesting of the user guide information via the second external electronic device; and in response to at least one of the received information or the user input, displaying the user guide information via a display device located at the selected place.

20. The method of claim 19, wherein the sensed information is information acquired by a sensor module configured to monitor inside of the second external electronic device.

* * * * *